US011250721B2

(12) United States Patent
Angel et al.

(10) Patent No.: US 11,250,721 B2
(45) Date of Patent: Feb. 15, 2022

(54) INTEGRATED STUDENT-GROWTH PLATFORM

(71) Applicant: Renaissance Learning, Inc., Wisconsin Rapids, WI (US)

(72) Inventors: Mark Angel, Las Vegas, NV (US); Robert Zieroth, Wisconsin Rapids, WI (US); Pete Jungwirth, Wisconsin Rapids, WI (US); Eric Stickney, Madison, WI (US); Diana Blythe, Portland, OR (US); Gena Kukartsev, Vancouver, WA (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 0 days.

(21) Appl. No.: 17/086,733

(22) Filed: Nov. 2, 2020

(65) Prior Publication Data
US 2021/0118317 A1    Apr. 22, 2021

Related U.S. Application Data

(63) Continuation of application No. 15/483,976, filed on Apr. 10, 2017, now Pat. No. 10,825,348.
(Continued)

(51) Int. Cl.
*G09B 7/06* (2006.01)
*G09B 5/06* (2006.01)
*G09B 5/12* (2006.01)

(52) U.S. Cl.
CPC ............... *G09B 7/06* (2013.01); *G09B 5/065* (2013.01); *G09B 5/12* (2013.01)

(58) Field of Classification Search
None
See application file for complete search history.

(56) References Cited

U.S. PATENT DOCUMENTS

| 8,696,365 B1 | 4/2014 | Bainbridge et al. |
| 2008/0131863 A1 | 6/2008 | Stuppy |

(Continued)

OTHER PUBLICATIONS

International Search Report and Written Opinion for International Application No. PCT/US2017/026861, dated Jun. 19, 2017, 18 pgs.
(Continued)

*Primary Examiner* — Nathan Hillery
(74) *Attorney, Agent, or Firm* — Patent Law Works LLP

(57) ABSTRACT

Some embodiments of an integrated student-growth platform for discovering, designating, and organizing heterogeneous instructional electronic resources based on observational assessments of students are disclosed. The student-growth platform is configured to establish and generate the best possible set of skills and resources for an educator to teach a group of students on a particular day and for a student to quickly progress to meet preferred educational standards. In one embodiment, the student-growth system includes a communication unit for sending and receiving data among users (e.g., teachers and students), an assessment platform, a planning platform, a learning-progression platform, an assignment platform, a mastery-maker platform, a Multi-Dimensional Response Item (MIRT) platform, and a reporting platform. The assessment platform 220 collects observation data for a target student, identifies one or more indicators to the learning-progression platform, which is coupled to the assignment platform, the mastery-maker platform, the MIRT platform, and the reporting module.

20 Claims, 16 Drawing Sheets

Related U.S. Application Data

(60) Provisional application No. 62/320,595, filed on Apr. 10, 2016.

(56) References Cited

U.S. PATENT DOCUMENTS

| | | |
|---|---|---|
| 2011/0129808 A1 | 6/2011 | Srivastava |
| 2011/0264649 A1 | 10/2011 | Hsiao et al. |
| 2012/0244510 A1 | 9/2012 | Watkins, Jr. |
| 2013/0040277 A1 | 2/2013 | Linton et al. |
| 2013/0042007 A1 | 2/2013 | Linton et al. |
| 2013/0111363 A1 | 5/2013 | Linton |
| 2014/0242565 A1 | 8/2014 | Abts |
| 2016/0071424 A1 | 3/2016 | Harney et al. |

OTHER PUBLICATIONS

Renaissance Learning, Inc., "Renaissance Special Report: The Renaissance Mastery Model," 2006, 5 pgs.

INTEGRATED STUDENT-GROWTH PLATFORM

CROSS-REFERENCE TO RELATED APPLICATIONS

This application is a continuation of U.S. patent application Ser. No. 15/483,976, titled "Integrated Student-Growth Platform," filed on Apr. 10, 2017, which claims the benefit under 35 U.S.C. § 119(e) of U.S. Provisional Patent Application No. 62/320,595, titled "System and Method for the Discovery and Organization of Heterogeneous Instructional Resources to Optimize Student Growth," filed on Apr. 10, 2016, the contents of both of which are incorporated herein by reference in their entireties.

BACKGROUND

1. Field of the Invention

The present invention relates to systems and methods for use in learning in an educational environment. More particularly, the present invention relates to an integrated architecture for a student-growth platform for use in an educational environment for the discovery and organization of heterogeneous instructional resources to optimize student growth and development in an online, cloud-based environment. This student-growth platform provides the ability to surround the instructional process, at any level (district, state, national, or global) with growth-optimizing options and integrates assessment, teaching, and learning-solution operations for students and educators.

2. Description of the Related Art

Teachers are continually faced with the problem and challenges of planning lessons before teaching students. It is estimated that teachers today can spend as much as seven to ten hours per week assembling lesson plans.

With digital instruction on the rise, within the last twenty years, this lesson-planning exercise has become quite an ordeal for teachers. In the past, teachers often relied on a printed textbook to impart from and organize student learning. Yet, with the increasing use of digital resources, teachers have an increasing desire to build lesson plans typically involving a combination of core curriculum, supplemental resources, and ad hoc internet-based resources (OERs). However, searching for, finding and organizing instructional resources into an efficacious and differentiated lesson plan that varies and is tailored to individual students has become a daunting task. As the digital universe of educational content expands and the complexity of digital curriculums increases, the lesson-planning exercise only becomes more challenging and time consuming every day.

Research reveals that the lesson-planning exercise and ordeal consumes at least seven to ten hours weekly. In many teaching scenarios, teachers build lesson plans by using ad hoc variations of a seven-step workflow with each step typically relying on a distinct tool such as MS Excel, Google, and pen & paper. The typical seven-step workflow includes: 1) review student data (50 minutes); 2) identify learning objectives using a pacing guide (20 minutes); 3) prepare to teach this week's skills or concepts (25 minutes); 4) search for instructional resources (45 minutes); 5) create homework (50 minutes); 6) find or build assessments (90 minutes); and 7) create assignments (50 minutes).

Existing digital instruction technology is unable to help teachers, bridge the gap from use of assessment data to identifying particular skills that a particular student or student group is ready to learn. Nor can it use those target skills to first identify relevant instructional resources and then, to organize those resources to optimize and accelerate student learning, growth, and performance toward achieving academic excellence. Previous solutions were inadequate or deficient and are solved by the present technology.

SUMMARY

The present technology created overcomes the deficiencies and limitations of prior systems and methods, at least in part by, providing an integrated learning and student-growth platform with improved systems and methods for discovery, organization and prescription of heterogeneous instructional resources for student learning and development.

The student-growth platform instantiates a closed-loop system accepting teacher context (including a chosen curriculum), and student context (including assessment) and automatically generating an output with a digital lesson plan. In some embodiments, the closed-loop system, global in scope, comprises five fundamental elements: 1) a growth-projection engine or platform; 2) a universal-skills-pool engine or platform; 3) a curriculum-to-skills-mapper engine or platform; 4) a growth-optimizing-instructional-resource-recommendation engine or platform; and 5) a lesson-planning platform.

In accordance with one aspect of the invention, the student-growth platform uses a student growth percentile (SGP) algorithm to uniquely position a target student or a target group of students into a scaled learning progression scheme based on the amount of time elapsed since the last set of assessments for the target student or the target group of students. In some implementations, this SGP algorithm may be implemented by a scaled learning-progression engine, which determines if particular students fall into a particular group, a class, a group of classes, a school, a group of schools, a district, or a state.

In accordance with another aspect of the invention, the student-growth platform has a system and method adapted to establish the best possible set of skills to teach a group of students on a particular day. This system and method combines computer-adapted testing (CAT)+student-growth-percentile (SGP)+time-based projection+entry points to establish curriculum entry point.

In accordance with yet another aspect, the student growth system has a mastery-model system that is adapted to combine a student's CAT scores with practice scores and evaluate the combined score against a learning progression scheme. This innovation focuses on normalizing computer-adapted testing outcomes (GOMs) with practice assignments to create an integrated model of mastery, which may be evaluated against a learning progression scheme.

In accordance with yet another aspect, the student-growth platform has a mastery model, extended by an inferencing capability. The integrated mastery model extends actual testing, by using intelligent inferencing capability, based on determining the relationship of objects within the learning progression scheme.

In accordance with yet another aspect, the student-growth platform utilizes a universal-skills-pool to enable curriculum mapping. This feature, system, or method facilitates lesson planning by mapping to the teacher's chosen curriculum, pacing guide, or text book. Skills may be divided by domains. In some embodiments skills may be divided into four domains including foundational skills, language, literature, informational text.

In accordance with yet another aspect, the student-platform has a seven step planning engine, which is a lesson-planning engine that mirrors or simulates a teacher's complete process by providing a score-to-skill-to-resource-to-assignment-to-plan-management process.

In accordance with yet another aspect, the student-growth platform has a multi-dimensional-response-item (MIRT) model that is utilized to bind assignments from assessment, instruction, and practice assignments into a unified scale that supports the other aspects of the student-growth platform.

In accordance with yet another aspect, the student-growth platform has a four level mastery model supporting lesson planning that has the ability to view mastery by assignment source, by probed assessment, by general outcome measurement (GOM) assessment, and by an integrated model.

In accordance with yet another aspect, the student-growth platform uses a universal skills pool to bridge from a GOM to a range of curriculums. This feature or system enables the lesson planning engine to act as a Rosetta Stone or like language capability for automatically linking multiple assessments to multiple government-created learning standards.

In accordance with yet another aspect, the student growth system or platform has a mechanism for probabilistic mastery, by which probabilistic algorithms are incorporated into the student-growth platform.

In accordance with yet another aspect, the student-growth platform has an open-lesson planning eco-system, by which the lesson planning process weaves into many different assessment sources with many different standards, curriculums, instructional resources, and assignment delivery systems.

The system and methods disclosed here are advantageous in a number of respects. They provide a significant improvement over existing systems and other solutions that exist. The integrated student-growth platform enables successful competition with "Assessment" vendors that lack the ability to create a complete feedback loop, and "Practice" vendors, who lack assessment functionality. The student-growth platform is global in scope and enables any education company or organization in the world to build a network-effect based category that spans separate markets in "ed-tech" today. The innovative approach of the instant technology is combined with unique access to student data to provide significant competitive advantages. This cutting edge approach of the student-growth platform may be implemented by a single source implementation, an implementation with assignment generation, and/or an implementation with curriculum mapping.

The student-growth platform in accordance with the present invention advantageously solves four significant problems that have in the past defeated other attempts to create a system for organizing resources into growth-optimizing lesson plans. The first is management of heterogeneous resources. Lesson planning solutions so far have typically focused on utilizing resources from one or a small number of sources. By using a recommendation engine coupled to a universal-skills-pool engine, the student-learning-and growth platform allows teachers or educators to employ almost any IR in their lesson plan.

The second is that teachers must bring their own instruction. Teachers use a wide range of curriculums (text books, core instructional software, and pacing guides) to provide the frame for lesson planning. Most solutions either ignore the teacher's chosen curriculum or require the teacher to abandon that solution and employ a different scope & sequence of skills instruction embedded into the solution. The student-learning-and-growth platform advantageously allows teachers to utilize their chosen curriculum in the planning process, regardless of what curriculum they've chosen.

The third advantage is planning from projected growth data. Most lesson planning proceeds from a point of either no data available or from observation of assessment information that is not current. Lesson planning is typically performed weekly and often with even greater frequency. The student-learning-and-growth platform has a growth-projection engine that translates assessment data into an actionable planning template, building a valid bridge from historical assessments on a student to a student's zone of proximal development (ZPD) in a short time.

The fourth advantage is the automated workflow. Lesson planning solutions so far have failed to mirror the full end-to-end process employed by teachers. As a consequence, they have not delivered meaningful reduction in teacher time spent in planning lessons.

Other innovative aspects include corresponding systems, methods, apparatus, and computer program products.

It should be noted that the language used in the present disclosure has been principally selected for readability and instructional purposes, and not to limit the scope of the subject matter disclosed herein.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

The systems and methods of this technology are directed to system architecture, technical platforms (e.g., to facilitate and link educational activities involving input and output by different users) and methods configured to facilitate student growth and development, by providing an integrated student-growth platform with technical tools for use in an online, cloud-based environment, for improving the educational process. This integrated student-growth platform provides a comprehensive view of student growth and mastery available for educators, by its observational interface, accessible to users or clients. This integrated student-growth platform addresses the problems that educators have faced so far, on how to accurately measure and monitor student growth and performance on a daily basis, as well as, differentiate and personalize instruction to each student. The integrated student-growth platform in accordance with the present invention permits educators to set goals and monitor student progress with greater efficiency. This integrated student-growth platform includes a workflow engine that allows educators (e.g., teachers) to manage and deliver all assignments from assignment engines to subject practices through a simple-to-use student inbox. This student-growth platform provides educators with a comprehensive view of student growth and mastery while giving them more time to focus on students. The student-growth platform fully integrates learning analytics to make decisions and lay the groundwork for increased interoperability with existing school systems and instructional partners.

Figure 1A:
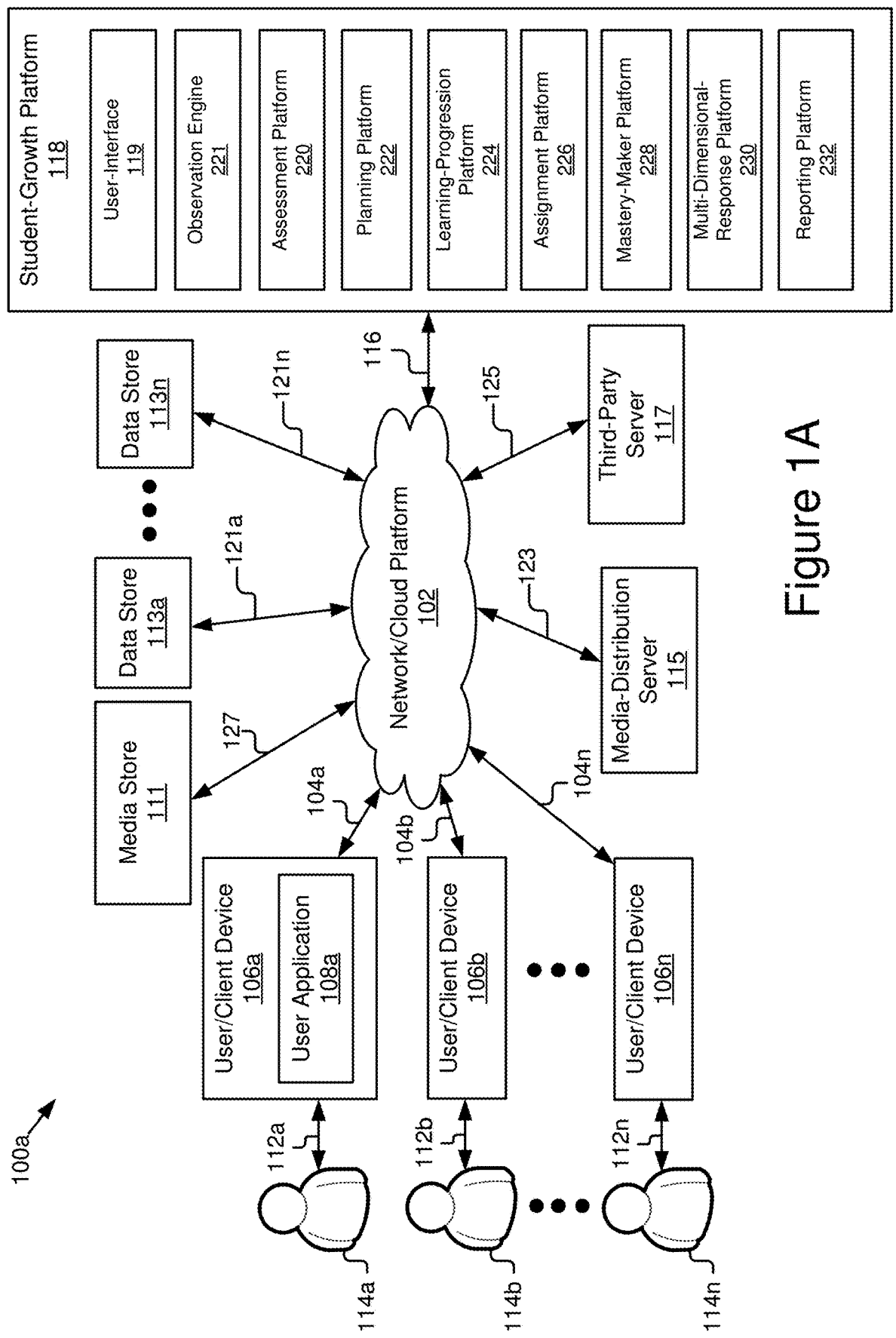
FIG. 1A is a high-level block diagram illustrating a networked distributed environment including user/client devices for use by users (e.g., students, teachers, etc.) coupled to an integrated student-growth platform including different platforms with specific functions and dedicated to specific operations for educational use.

FIG. 1A illustrates a general distributed environment (e.g., cloud-based) as designated generally by reference numeral 100a, with users 114a, 114b, through 114n, using user/client devices, 106a, 106b, through 106n, and interacting with an integrated student-learning-and-growth platform 118, via a network 102. Each of the user devices may have a user application 108a. User/client communications flow via lines 112a, 112b, through 112n, respectively, to the user devices, 106a, 106b, through 106n, and through lines 104a, 104b, through 104n, to the network 102 and through line 116 to the student-learning-and-growth platform 118. The integrated student-learning-growth platform 118 integrates functionalities of various platforms, including but not limited to, an assessment platform 220, a planning platform 222, a learning-progression platform 224, an assignment platform 226, a mastery-maker platform 228, a MIRT (multi-dimensional-response) platform 230, and a reporting platform 232. Access to each of these platforms is accomplished via an observation engine 221, which is a part of the user interface of the student-growth platform 118. Such platforms facilitate digital reading and enable collaboration in and with the pages of digital books, articles, and documents, enabling users to embed materials and assignments in the text itself or attach them and provide them separately. They facilitate attaching highlight and tag functions to a piece or portion of text in a single action or activity. In some implementations, the text of interest or display for use in assessment, lesson planning, or any other task described here may be a digital book, an electronic article, or any other available text content presented by a suitable electronic device. In some examples, the text may be the text content on a page of a digital book available on the web or downloaded as an ePub (electronic publication) or PDF (portable document format).

The integrated student-growth platform 118 may include one or more servers with one or more processors and one or more storage devices storing data or instructions executable by the one or more processors. For example, the integrated student-growth platform 118 may be a server, a server array or any other computing device, or group of computing devices, having data processing, storing and communication capabilities. The integrated student-growth platform 118 may be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). It should be understood that the integrated student-growth platform 118 may be made up of any combination of devices and servers, or only one device or server. The integrated student-growth platform 118 may interact with the user devices 106a-106n or other third-party servers 117 or media-distribution servers 115, media store 111, or data stores 113a through 113n, of the distributed system 100a, via the network 102, or may be coupled to and interact with any of these entities via a direct data connection.

In some embodiments, the entities of the distributed system 100a including the integrated student-growth platform 118 and the media-distribution server 115 may be implemented using cloud-based architectures where one or more computer functions are performed by remote computing systems and devices at the request of a local computer device. For example, a user/client device 106a may be a computing device having a limited set of hardware and/or software resources and may access hardware and/or software resources provided across the network 102 by other computer devices and resources, such as other user devices 106b, the third-party server 117, the integrated student-growth platform 118, or any other computing resources. The user/client device 106a may access these resources through a user application 108a, such as a web browser or customized application, and the results of any computer functions or resources may be delivered through the user application 108a to the user/client by the user device 106a, such as those described. The integrated student-growth platform 118 may be a cloud-based distributed computing system having dynamically scalable and virtualizable resources, and various functionality of the integrated student-growth platform 118, including the functionality of the assessment platform 220, the planning platform 222, the learning-progression platform 224, the assignment platform 226, the mastery-maker platform 228, the multi-dimensional-response platform 230, and the reporting platform 232 and/or the media-distribution server 115 may be carried out and supplemented by computing systems and devices distributed over the network 102. Although only one integrated student-learning-and-growth platform 118 is shown, multiple servers/platforms 118 may be included in the system 100a for regional or global reach or for specific purposes.

The media-distribution server 115 is a computing device and/or system for transmitting electronic resources stored in or available through the media data store 111 to the other entities of the environment 100a. In some embodiments, the media-distribution server 11 cooperates with the integrated student-growth platform 118 to provide an electronic resource to a user (e.g., teacher or student) for consumption. For example, the assessment platform 220 or the assignment platform 228 of the integrated student-growth platform may transmit a file (e.g., a webpage) to a user/client device 106 for display to the user/client 114. In some instances, the file may include code (e.g., a video player) executable to receive a video and/or audio stream (e.g., an electronic resource) from the media distribution server 115 and render it for display to the user/client. In other embodiments, the integrated student-growth platform 118 performs the function of the media-distribution server 115. In the depicted embodiment, the media-distribution server 115 is coupled to the network 102 via signal line 123 for communication with the other entities of the environment 100. The media-distribution server 115 is also coupled to the media store 111 to access electronic resources and other data stored in the media store 111. In some embodiments, the media-distribution server 115 is a hardware server including a processor, memory and network communication capabilities. In other embodiments, the media-distribution server 115 is a virtual server.

In some embodiments, the media-distribution server 115 transmits video and audio streams to one or more user/client devices 106a-n. The video and audio streams may be live feeds or may be previously recorded, stored as media objects in the media store 111, and transmitted to the one or more user/client devices 106a-n on demand, via delayed broadcast, etc. In some embodiments, the audio and video are streamed from the media-distribution server 115 via the network 102. In other embodiments, a user/client can download an instance of the video and audio media objects from the media-distribution server 115 to a local repository for storage and local playback.

The media-distribution server 115 and/or the integrated student-growth platform 118 is/are capable of transmitting any number of electronic resources to any number of user/client devices 106a-n simultaneously. While in the illustrated embodiment, only one media-distribution server 115 is shown, any number of media-distribution servers 115 and/or media stores 111 may be included in the distributed environment. For example, the media-distribution server 115 and the media store 111 may be a distributed server and storage system with local instances strategically located in locations where spikes in demand for the electronic resources are likely to occur. For example, if a cluster of user/client devices 106a-n are located in a particular geographic region, local instances of the media-distribution server 115 and the media store 111 may be coupled to the network 102 in that geographic region such that the media objects stored in the media store 111 may be served locally and at a faster data rate to that cluster of user/client devices 106a-n.

It should be understood that, in some embodiments, the media-distribution server 115 and/or the third-party server 117 have the same or similar architecture (e.g., memory, processor, communication unit, bus, etc.) as the integrated student-growth platform 118 illustrated in FIG. 2, and thus the description of those components applies to the media-distribution server 11 and/or the third-party server 117.

The media store 111 is an information source for storing data and providing access to stored data. The stored data may include the electronic resources described above, such as media objects including video, audio, vector-based files, electronic books, documents, etc. In some embodiments, the media store 111 is included in the memory (not shown) of the media-distribution server 115. In other embodiments the media store 111 is included in the memory 404 (see FIG. 4) of the integrated student-learning-and-growth platform. In yet other embodiments, the media store 111 is included in a server or storage system distinct from but accessible by the media-distribution server 115 and the integrated student-learning-and-growth platform. In some embodiments, the media store 111 includes a database management system (DBMS) executable by a processor to manage a collection of records, files, and objects including the media objects. For example, the database could be a structured query language (SQL) DBMS. In these embodiments, the integrated student-learning-and-growth platform 118 and/or the media-distribution server 115 are coupled to a data store 113a through 113n, via the bus 406 to store data in multi-dimensional tables having rows and columns, and manipulate, i.e., insert, query, update and/or delete, rows of data using programmatic operations (e.g., SQL queries and statements).

The third-party server 117 is a server hosting a network-based software application operable to provide various services or functionalities, and to send data to and receive data from the integrated student-learning-and-growth platform 118, the media-distribution server 115, and the client devices 106a . . . 106n via the network 102. In the depicted embodiment, the third-party server 1117 is coupled to the network 102 via signal line 125 for communication with the other entities of the system 100. The third-party server 117 is also coupled to the data stores 113a-113n by signal lines 121a and 121n for accessing and storing data. In some embodiments, the third-party server 117 is a server, server array or any other computing device, or group of computing devices, having data processing, storing and communication capabilities. In other embodiments, third-party server 117 is a virtual server.

The third-party server 117 can provide access to data stored in the data store 113a-113n that is associated with users of the integrated student-learning-and-growth platform 118. In some embodiments, the data stored in the data store 113a-113n may include demographics data, achievement data, student data, teacher data, standards data, inter-rater reliability data, etc., and the third-party server 117 may include a software application for providing secure access to this data to the integrated student-learning-and-growth platform 118 over the network 102 via an API. For example, in an educational setting, the demographics data may include instructor and pupil demographics data, and may be segmented across school district, school, classroom, grade, etc.; the achievement data may include standardized test scores for educators and pupils; the student data may include student assessments of teachers (e.g., aggregated from surveys, reviews, etc.), biographical data describing the students, social graph data (e.g., aggregated from third-party social networking services), etc.; the teacher data may include biographical data describing the teachers, social graph data (e.g., aggregated from third-party social networking services), teacher preferences, teacher assessments of students (e.g., aggregated from surveys, reviews, etc.), etc.; and the standards data may include standards compiled and approved by a governing organization or institution which define the levels of attainment pupils much reach to be considered acceptably educated. It should be recognized that the fifty states in the U.S. may have unique needs and standards for education. The standards may require a varying range of skills. In some embodiments, a local instance of the data stored in the data store 113a-113n may be included in the data store 113a-113n. For example, a batch program operating periodically (every few minutes, hours, days, weeks, etc.) may retrieve a refreshed version of the data stored in the data store 113a-113n.

In FIG. 1A, the integrated student-learning-and-growth platform 118 includes an user-interface unit 119, an observation engine 221, an assessment platform 220, a planning platform 222, a learning-progression platform 224, an assignment platform 226, a mastery-maker platform 228, a multi-dimensional response platform 230, and a reporting platform 232. The assessment engine 220 is software including routines for providing network-based assessment of students.

In some embodiments, the integrated student-learning-and-growth platform 118 may collect and store mapping information (i.e., social graphs) in the data store 113a-113n mapping how all users 106a-106n of the integrated student-learning-and-growth platform 118 are associated. For example, the social graph of each user may describe that user's 114a relationships with other users 114n, based at least in part on shared attributes, etc. All users 114a-114n may be associated by school, school district, subject matter taught, amount of experience, etc. Users may also define their own connections and sets of users using functionality provided by the client application 108 in cooperation with the integrated student-learning-and-growth platform 118. For example, users 114a-114n sharing a similar subject matter may add one another to their community by using functionality provided by the client application 108a in cooperation with the integrated student-learning-and-growth platform 118. The integrated student-learning-and-growth platform 118 may also generate and maintain a user profile in the data store 113a-113n for each user of the integrated student-learning-and-growth platform 118. A user profile is a collection of personal and student/teacher/administrator data that is unique to a specific user. In some embodiments, the user profile is a digital representation of that person on a student/teacher/administrator development service and includes a user's customized settings and preferences, biographical information, schooling information, personal interests, teacher/administrator information, lesson-plan development information, social connection information, etc.

In some embodiments, access to the integrated student-learning-and-growth platform 118 via the network 102 may be provided to teachers and administrators in an academic environment or other educational setting, such as a school district. Instruction may be provided by electronic resources.

An electronic resource may be any electronic media for conveying information. For example, an electronic resource can be instructional in nature, and can convey knowledge, information, and resources to a user who interacts with or views it. As a further example, an electronic resources may include an instructional audio or video segment, a publication, an interactive instructional reference, a lesson plan, a planning tool, a community forum, a sharing tool, an industry standard, a portfolio tool, a progress monitoring tool, a reporting tool, etc. In some embodiments, an electronic resource can include any of textural data, graphical data, video data, audio data, etc. For example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc. In these or other examples, the electronic resource may include a dataset/electronic file with text, graphics, video, audio, etc. embedded therein.

In some embodiments, these electronic resources may convey information on various topics, such as student training, teaching skills, and similar subjects of consequence and importance to the growth and development of the users. For instance, for teachers an electronic resource may be an instructional video about an aspect of teaching, and a teacher may view the video by streaming it using his/her client device 106. In another example, the electronic resource may be a web-based interactive reference including text, audio, video, etc., and the teacher may study the reference by interacting with it via a client application 106 such as a web browser before determining that it is appropriate for a particular student, student group or a particular lesson plan.

Figure 1B:
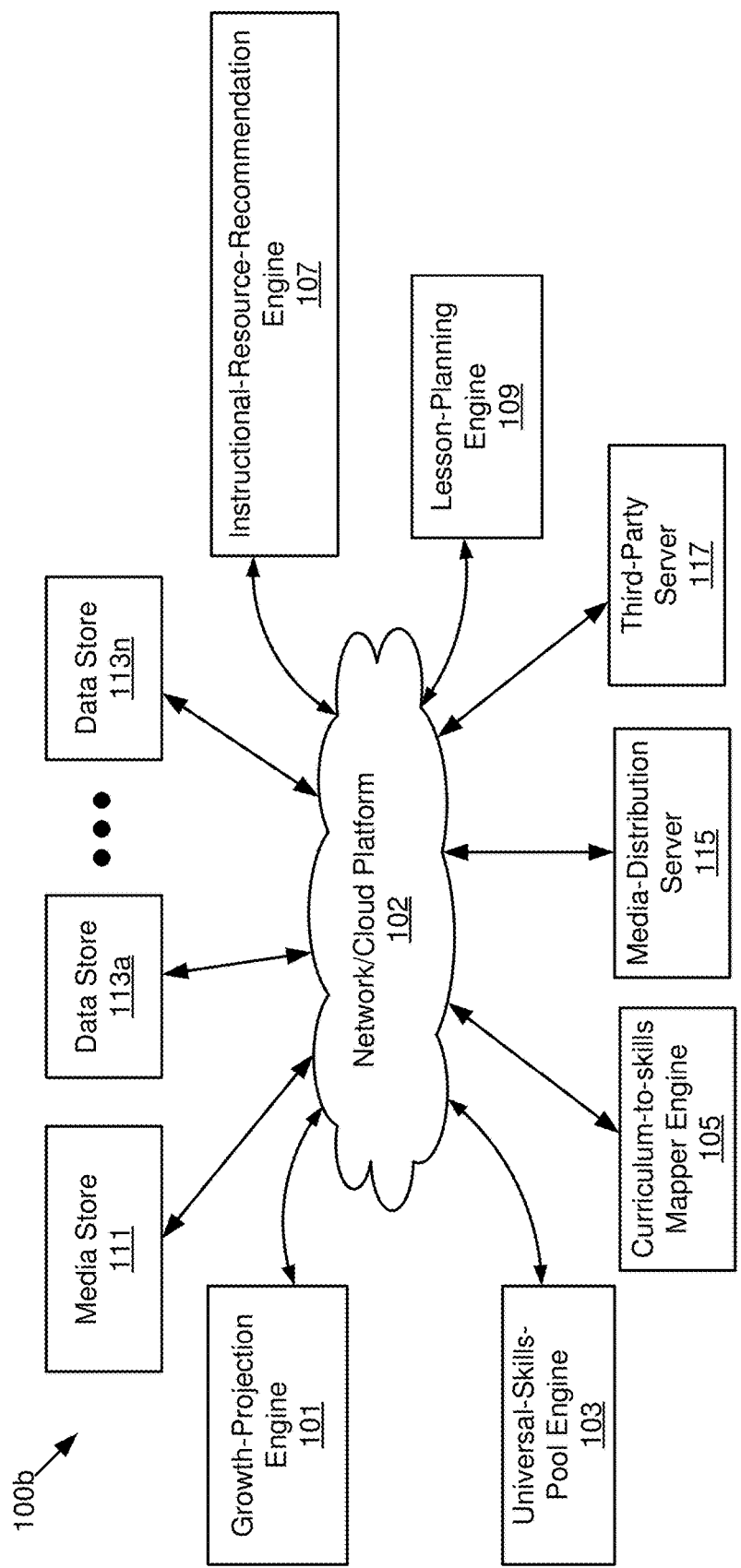
FIG. 1B is a high-level block diagram illustrating an alternative embodiment of the distributed environment illustrated in FIG. 1A.

FIG. 1B illustrates an alternative embodiment including a growth-projection engine 101 connected through the network 102 to a universal-skills pool 103, a curriculum-to-skills mapper 105, an instructional-resource-recommendation engine 107, a lesson-planning engine 109, and the media store 111, a data store 113a-113n, media-distribution server 115 and the third-party server 117. As illustrated here, the student-growth platform instantiates a closed-loop system accepting an input of teacher context (including a chosen curriculum) and an input of student context (including assessment) and automatically generating an output with a digital lesson plan. The closed-loop system, global in scope, may be tailored by institution or educational intent and comprises at least five fundamental components: 1) a growth-projection engine 101; 2) a universal-skills-pool engine 103; 3) a curriculum-to-skills-mapper engine 105; 4) an instructional-resource recommendation engine 107; and 5) a lesson-planning engine 109.

The student-growth system has a unique student growth percentile algorithm (SGP) to selectively position a student or a group of students into a scaled learning progression scheme, based on the amount of time that has elapsed since observation of the last set of assessments on a particular student. In some implementations, this unique SGP algorithm may be implemented by a scaled learning progression schemes (similar to those used by the learning-progression platform in FIG. 1A), which may determine if students fall into a particular group, a class, a group of classes, a school, a group of schools, a district, or a state. The learning-progression schemes are adapted to establish the best possible set of skills to teach a group of students on a particular day. This combines the CAT (Computer Adapted Testing)+SGP (Student Growth Percentile)+time-based projection+entry points to establish curriculum entry point. The universal-skills pool engine 103 bridges from a GOM to a range of curriculums. This feature enables the lesson-planning engine 109 to act as a Rosetta Stone or like language capability for linking many assessments to many government-created learning standards.

After a user (e.g., educator or teacher) selects the learning objectives (skills) and chooses to build a lesson plan, by the lesson-planning engine 109, the user/client 106 may choose the student resources and assessments to include in the lesson plan for each group. Resources may include sample items, worked examples, videos, lessons, definitions, or activities. Assessments include assessment probes designed to evaluate a level of skills. As a user selects resources and assessments, they may be assigned to student groups.

When a teacher generates a lesson plan, students automatically see the resources and assessments in the assignments list on their home page once the lesson plan begins. At the top of the add resources and assessments page, the teacher sees the learning objectives (skills) that was selected. If the teacher wants to concentrate on resources and assessments for one skill at a time, only that skill may be checked. The teacher may easily change which skills are checked as the teacher adds resources and assessments. If the teacher chooses more than three skills, the teacher may use the scroll bar to see the rest of the skills. Resources and assessments that are related to the checked skills are already listed on the page. The template may be configured to show colored squares for each resource or assessment to show the viewer which of the skills it relates to. For example, in one example, the colors show the viewer that the resource is for the second skill.

For the purposes of this disclosure, it should be recognized that education has many standards and preferences that must be met in a particular country, state, or district. For example, the common core state standards initiative in the U.S. is an educational initiative that details what K-12 students should know in English language arts and mathematics at the end of each grade. This initiative seeks to establish consistent educational standards across the states as well as ensure that students graduating from high school are prepared to enter credit-bearing courses at two or four-year college programs to enter the workforce. The student-growth platform 118 approaches student development based on a universal-skills pool approach that is made available through learning progression schemes. This approach is based on selecting a range of skills that are appropriate for a specific scale score accorded to a student or group of students. A scale score delivers or specifies an entry point into the learning progression schemes that represents the student's "zone of engagement." This zone of engagement includes a range of skills that the student is more likely to be ready to learn. This improves the accuracy of the data and insights that are provided to teachers to inform their instruction. The planner (e.g. teacher) permits aligning learning progressions to pacing guides, district curriculum, and textbooks. This makes the learning progression (by subject) more useful to teachers and administrators focused on a curriculum and not just a standard.

Figure 2A:
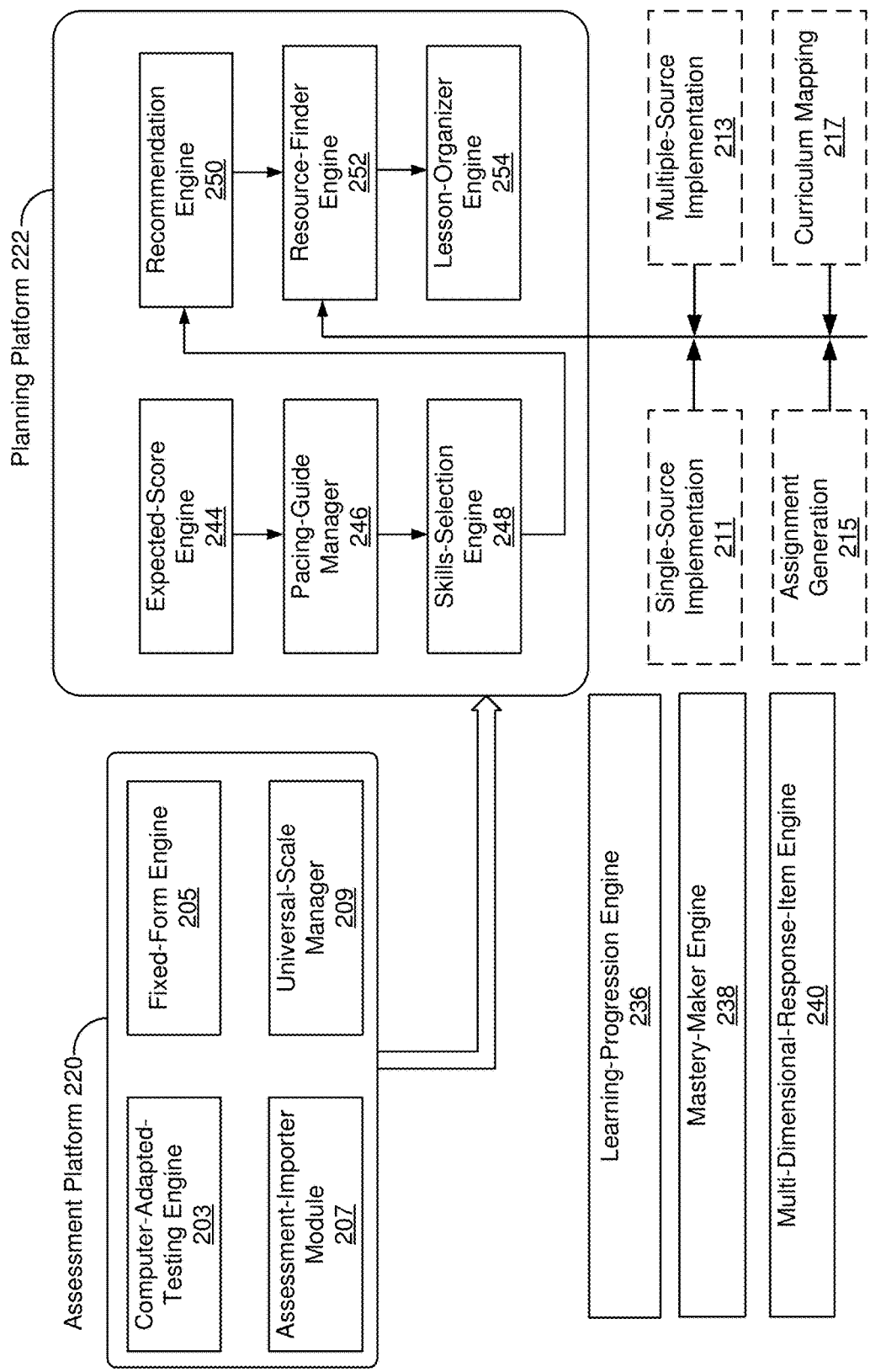
FIG. 2A is a block diagram illustrating example assessment and planning platforms within the integrated student-growth platform illustrated in FIG. 1A.
Figure 3:
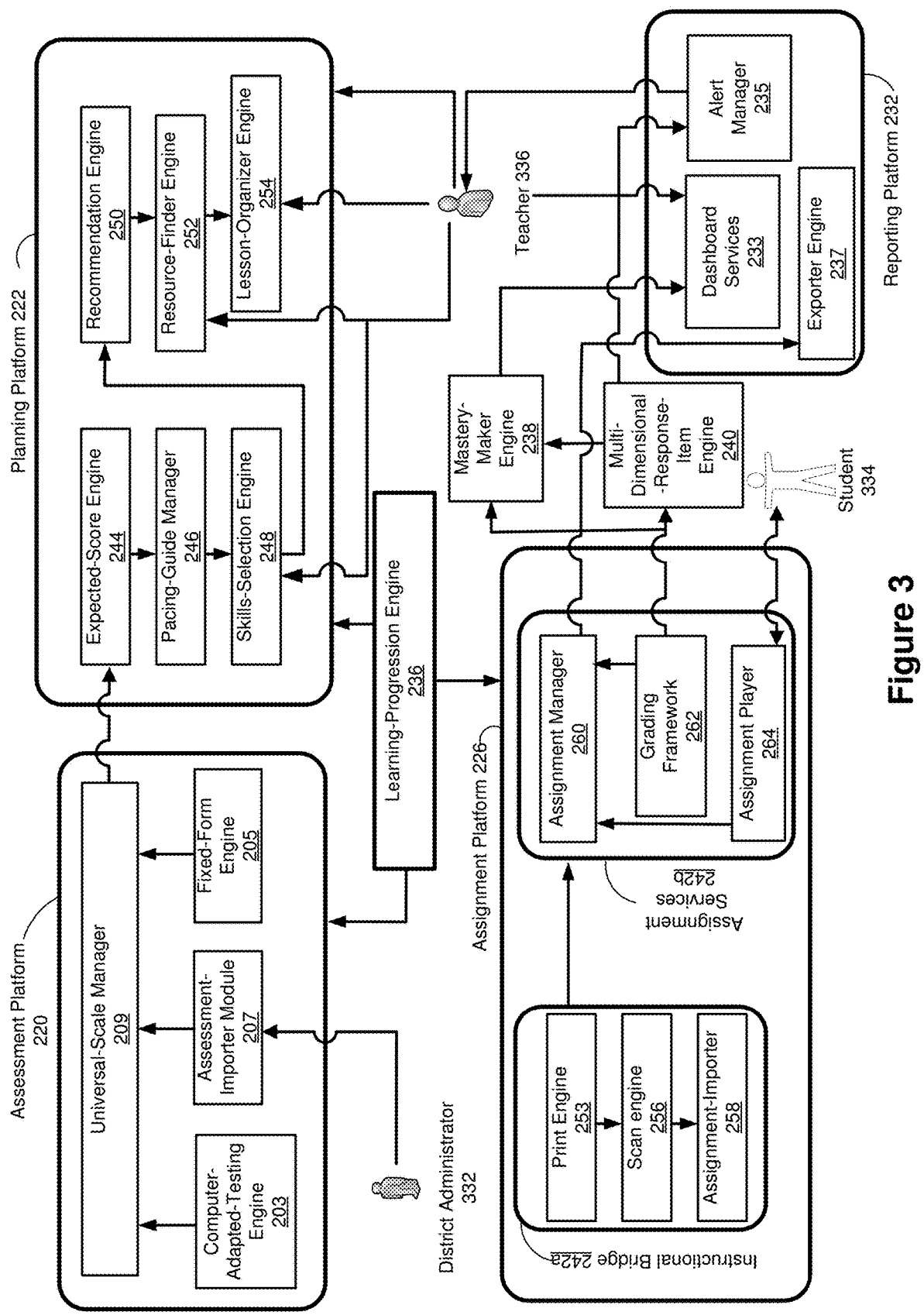
FIG. 3 is a block diagram illustrating an example integrated student-growth platform with integrated assessment, planning, assignment, reporting coupled to the learning-progression engine, the master-maker engine and other elements of the platform.

Referring now to FIGS. 2A and 3, the assessment platform 220 of the student-growth platform 118 includes a computer-adapted-testing engine 203, a fixed-form engine 205, an assessment-importer module 207, and a universal-scale module 209. The assessment platform 220 as illustrated may be accessed by district administration of an institution to obtain previous or old assessments for a particular student or group of students that may be imported by the assessment-importer module 207 from sources that have these assessments. The universal-scale module 209 receives inputs from the computer-adapted-testing engine 203, fixed-form engine 205 and the assessment-importer 207. The universal-scale module 209 positions a target student into a standard scale (e.g., mandated by a governing body) based on testing data obtained from the computer-testing engine 203, prior data provided by a student determined by the fixed-form engine 205, and prior assessment data imported by the assessment-importer module 207.

The planning platform 202 includes an expected-score engine 244, a pacing-guide manager 246, a skills-selection engine 248, a recommendations engine 250, a resource-finder engine 252, and lesson-organizer engine 254. FIG. 2A also illustrates a learning-progression engine 236, a mastery-maker engine 238, and a multi-dimensional-response-item engine 240. In some embodiments, the planning platform 202 is coupled to a single-source implementation 211, a multiple-source implementation 213, an assignment generation unit 215, and a curriculum mapping unit 217.

The planning platform 202 computes and expected score for a target student based on where the target student is positioned (e.g., by comparing within a range of scores for the level where the target student is positioned). The pacing-guide manager 246 is software including routines for prescribing and managing the pace at which the target student should learn. The skills-selection engine 248 is software including routines for selecting skills appropriate for the level and pace prescribed for the target student. The recommendation engine 250 is software including routines for recommending instructional resources for the target student that are consistent and appropriate for the level determined and pace prescribed for the target student. The resource-finder engine 252 is software including routines for managing and providing resources and content for students. In some embodiments, the resource-finder engine 252 catalogs the electronic resources, provides for the addition or removal of electronic resources, transmits the electronic resources to students for consumption, tracks user consumption and interaction with the of electronic resources, etc.

The resource-finder engine 252 is coupled to the data store 410 (FIG. 4) and the media data store 111, either directly or via the media-distribution server 115, to access the electronic resources stored therein. In some embodiments, the resource-finder engine 252 can search the data store 410 and the media data store 111 to generate and collect information about the electronic resources. For instance, the resource-finder engine 252 can aggregate attributes of the electronic resources, such as the author, publisher, file size, creation date, publication date, a thumbnail of the resource, etc., and store them in a resource library database. In various embodiments, the resource-finder engine 252 can access the electronic resources in the data store 410 and the media data store 111 to transmit or stream copies of those resources to the client devices 106 of the users 114 requesting to interact with them.

The resource-finder engine 252 can also receive and store new electronic resources in the media data store 111 or the data store 410. In some embodiments, the resource-finder engine 252 may interact with the media-distribution server 118 to store information in the media data store 111. In other embodiments, the resource-finder engine 252 may store information in the media store 111 directly. In some embodiments, the resource-finder engine 252 may receive resource addition requests via the network 102, requesting the addition of electronic resources accessible to the student-growth platform 118. For example, the re-source finder engine 252 is capable of serving a webpage to a user/client device 106 that provides functionality for the user of the client device 106 to author or upload an electronic resource along with metadata characterizing it. The electronic resource may be an interactive electronic book, a video file, an audio file, a document, a dataset, an electronic link, or any other electronic resource that can be accessed and viewed by the observational engine 221 of via the student-growth platform. The resource-finder engine 252 may receive the additional electronic resource, store the metadata about the resource in the resource library database, and store the electronic resource in the data store 410 and/or media data store 111. Thus, the resource-finder engine 252 can update the resource library database, either periodically or real-time, with any new electronic resources that have been added to or removed from the student-growth platform 118.

The resource-finder engine 252 is capable of receiving requests for electronic resources from users 106 and fulfilling those requests by transmitting the electronic resources to the corresponding client devices 106 of the users 114. In one example, upon logging in to the student-growth platform, a user 106 may be presented with an interface by the user application 108 that shows any outstanding assignments that the user 114 must complete, the dates by the assignments must be completed, a description of what the assignments are, etc. Using this interface, the user 114 may select an assignment, in response to which the user application 108 transmits a request to the resource-finder engine 252 for the electronic resource associated with the assignment. In yet another example, an observer, upon logging in, may be provided with electronic resources (e.g., video, audio, etc.) by the resource-finder engine 252 in cooperation with the client application 108, which describes what to focus on, observe, evaluate, during an upcoming/pending observational assessment of a target subject. In these or other examples, electronic resources can be identified and served to the users based on the users' social graphs and/or preferences. The resource-finder engine 252, upon receiving this request, may locate the electronic resource in the data store 410 and provide it to the user application 108 via the network 102 for presentation to the user 114. As discussed elsewhere herein, the resource-finder engine 252 may, in some embodiments, cooperate with the media-distribution server 116 to provide the electronic resources for consumption and/or interaction by the users 114 requesting them.

When users consume or interact with the electronic resources provided by the resource-finder engine 252, the resource-finder engine 202 is capable of logging the consumption and interaction in the data store 410 in association with those users. In some embodiments, the resource-finder engine 252 cooperates with the user application 108 to monitor user interactions with the electronic resources. For example, when user interacts with a user interface generated and displayed by the user application 108, the user application 108 sends interaction data via the network 102 to the resource-finder engine 252 informing the resource-finder engine 252 of the interaction, and the resource-finder engine 252 stores this interaction data. In a further example, if a user interacts with a media player embedded in a user interface of the user application 108, interaction data describing the user's interactions, such which actions the user took (e.g., clicked a pause button, a play button, a scrubbing dial, volume dial; maximized the viewing field of the media player; added a comment about the video using an associated interface element; etc.) are sent by the user application 108 to the resource-finder engine 252 and the resource-finder engine 252 may log those interactions. The interaction data may also include or be associated with data identifying which electronic resource was interacted with, the user who interacted with the resource, the time and date of the interaction, etc. In another example, if a user is accessing an interactive electronic book, the user application can send interaction data describing when the user begins interacting with the electronic book, pages through the electronic book, downloads files included with or embedded in the electronic book, completes surveys included with the electronic book, views videos embedded in the electronic book, comments on passages of the electronic book, or otherwise uses any other functionality provided by the user application 108 for interaction with the electronic book or the corresponding components of the student-growth platform 118.

In some embodiments, the resource-finder engine 252 may provide the electronic resource to the user/client devices 106 with presentational information and the client application 108 may use the presentational information to form the look and feel of the user interfaces. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the client application 108 may interpret the interface instructions and render an interactive Web User Interface (WUI) for display on a user device 106 based thereon. In other implementations, the user/client application 108 may determine the formatting and look and feel of the user interfaces independently. Using the user interfaces presented by the client application 108, the user can input commands selecting various actions.

Figure 2B:
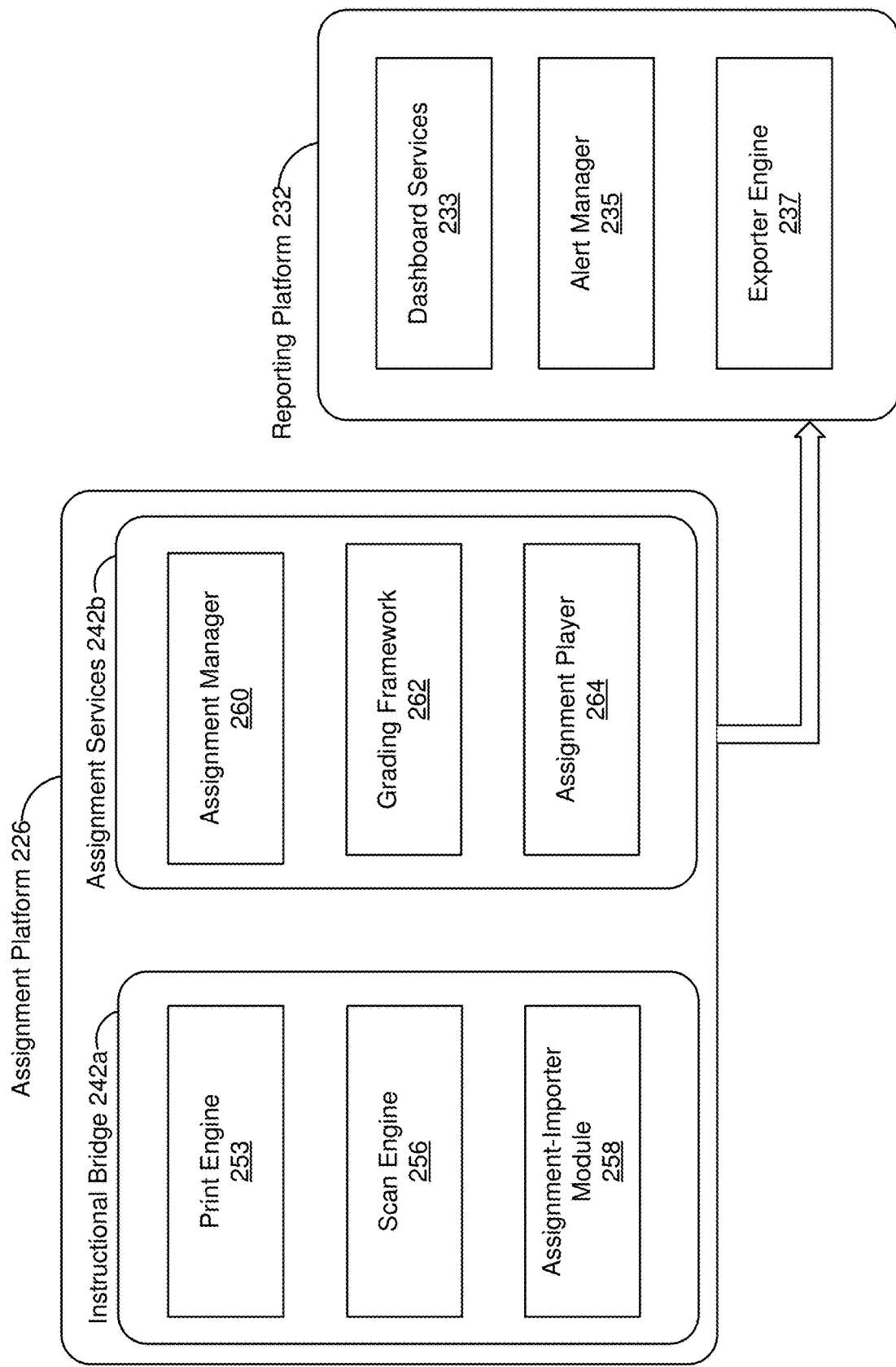
FIG. 2B is a block diagram illustrating example assignment and reporting platforms within the integrated student-growth platform.

Referring now to FIGS. 2B and 3, the assignment platform 222 illustrated with an instructional bridge 242a and an instructional bridge 242b. The first instructional bridge 222a includes a print engine 253 adapted to print assignments as needed, a scan engine 256 for scanning documents with assignments as needed, and an assignment-importer module 258 for importing or downloading assignments from other sources. The second instructional bridge 222b has an assignment manager 260 for managing assignments given to students, a grading framework 262, by which grading of assignments is accomplished, and an assignment player 264, by which assignments are conveyed to target students (e.g., by audio, video, or other forms of media). The reporting platform 232 includes dashboards/dashboard services 233, alerts/alert manager 235, and an exporter 237, by which completed assignments may be exported or sent for further consideration or storing.

In some embodiments, the user-interface unit 119 (FIG. 1), in cooperation with the observation engine 221 (FIG. 1), may generate a report dashboard/interface for viewing reports generated and provided by the reporting platform 232 and received by the observation engine 221. In some instances, the reporting platform 232 may provide diagnostic reports. This dashboard provides numerous advantages including providing an observer (e.g. teacher) or administrator with detailed information about a given target student's performance (e.g., execution, effectiveness, compliance, etc.) over time. For example, the observer may be a teacher using the dashboard, to access any previous observational assessments of that student or student group; view an overall performance (e.g., execution, effectiveness, compliance, etc.) view statistics across all observational assessments of that student or a subset, such as the observational assessments performed for that academic year; may quickly ascertain the areas a student has had problems with or has been working on, or the areas the student has been improving on; review the test scores for the student, view the electronic training resources the student has consumed/interacted with; view any work-product, lesson plans, videos, presentation, etc., the student has uploaded, the groups the student has interacted with, etc. Using this information, the teacher may quickly get up-to-speed on where the student is at, thus provide pertinent and relevant observations (e.g., evaluations, ratings, suggestions, comments, etc.) and assignments, etc., during the observation session to be performed. The alerts 235 may be adapted to generate and provide alerts depending upon certain criteria that are specified.

Referring specifically to FIG. 3, is should be recognized that in some example scenarios, a district administrator 332 may have access to the assessment platform 220 to generate the assessments required. A teacher 336 may have access to the planning platform 222 to plan and generate lessons and the student 334 may have access to the assignment platform 226 to receive and complete assignments.

The learning progression engine 316 drives information that is conveyed in the instructional planning and diagnostic reports that are generated. Learning progressions are descriptions of how learning typically advances in a subject area. Empirically based learning progressions can visually and verbally articulate a hypothesis, or an anticipated path, of how student learning will typically move toward increased understanding over time with good instruction. The learning-progressions engine 316 has an organizational structure, separated into domains, skill areas, and core skills. For example, a core progress scenario for mathematics has four domains, which form the base of the learning progression for that subject: 1) numbers and operations, 2) algebra, 3) geometry and measurement, and 4) data analysis, statistics and probability. The skills areas (e.g., whole numbers, place value, symbols and expressions, time etc.) represent the various skills and concepts students acquire as they progress in the development of mathematics at the level they are prescribed. The core progress learning progression is an interconnected web of prerequisite skills. For increased understanding over time, progress requires continually building up and building on a solid foundation of knowledge, concepts, and skills. The core progress learning progression is a map of skills created, where new learning is built on previous, foundational understanding of the subject. A core progress learning progression for a subject is defined in terms of a number of skills. Each skill is represented by a separate data point. The difficulty value may be derived from the calibrated difficulty of the test items from standard or existing tests to assess the skill level. There are several assessment items per skill, called an item-set.

Common to these perspectives is the idea that the development of learning progressions is an iterative process. It begins with a hypothesis, informed by what is known about student learning, which undergoes empirical testing and subsequent refinement based on the data. As another example, a core progress learning progression for reading was developed according to this iterative model. To reflect the organization of the standards, a core progress reading learning progression may have four domains, including 1) foundational skills, 2) language, 3) literature, and 4) informational text. The learning progression is comprised of five (sub) domains: 1) word knowledge and skills; 2) comprehension strategies and constructing meaning; 3) analyzing literary text; 4) understanding author's craft; and 5) analyzing argument and evaluating text. For each student group, grade-level domain expectations may be identified to describe the desired level of student understanding by the end of the year. These expectations form the foundation of the learning progression. The learning progression then goes a step further to identify the intermediate skills and concepts necessary for students to move toward those expectations. Learning progressions are a progression of cognitive states that move from simple to complex and, while not necessarily linear, the progression is not random, but rather is sequenced and ordered as "expected tendencies" or "likely probabilities" of how learning develops. Inherent in these views of progressions is the idea of a coherent and continuous pathway along which students move incrementally through states of increasing competence in a domain. Every incremental state builds on and integrates the previous one as students accrue new levels of expertise with each successive step in the progression. It is important to note, however, that while progressions may provide clear descriptions of how learning develops in a domain, they are not developmentally inevitable. Rather, they are dependent on good curriculum and instruction. The skill areas represent the various skills and understandings that students gain as they progress in their reading development. For example, the grade-level skill statements identify the incremental steps students take as they progress in acquiring specific skills and understandings. It should be recognized that the grade-level skill statements provide specific examples of relevant words and texts, but do not specify reading content or identify the activities students should be able to perform to reflect attainment of a skill. They are intended as statements of the skill itself, which serve to advance subject (e.g., reading or math) competence. The skill statements reflect levels of relative difficulty of skills and understandings identified in the progression from their most basic, foundational states through increasingly sophisticated states of competency. For example, in the learning progression for a student in grade two, a domain defined for comprehension strategies and constructing meaning may require a skill (defined in a particular area) identifying the author's purpose, based on an understanding that authors write texts for different purposes. Having established this basic understanding, students may move incrementally through successive steps of increasing competence so that by the middle-level grades they are able to evaluate the appropriateness of the form chosen by the author in light of the author's purpose. These focus skills and prerequisites act as building blocks; each representing a specific level of competency of a skill or understanding that rests on prior development and that also provides a foundation for the next level of learning. The learning progression engine 236 identifies for each focus skill, the associated prerequisites necessary to understand that skill, and provides these criteria across grades, skill areas, and domains. To continue with the example for reading, by the $10^{th}$ grade, the focus skill may require analyzing the cumulative impact of figurative language on wider themes and meanings of the text, from the domain defining an understanding of the author's craft. This domain may have five prerequisite skills that span two grades and three domains. The learning progress engine 236 may be further adapted to perform a quantitative analysis to determine where skills fall on an assessment scale (e.g., standard ones used by educators). This analysis may compare empirically observed order of skills (i.e., where skill difficulty falls on a measurement scale) to the pedagogically determined order of skills (i.e., the most productive order of skills for learning a particular skill).

Information and data flows from the Assessment Platform 220, to the expected-score engine 244, and from that point to the pacing-guider manager 246. Based on the assessment results (e.g. old or previous) for a particular student or group, the expected-score engine 244 designates an expected score for that student or group of students. Based on the expected score for a student, the pacing-guide manager 246 determines a pace appropriate for the student or group of students, and the skills-selection engine 248 matches the skills required for the pace determined for the student and student group. The recommendation engine 250 discovers and finds resources from the resource-finder engine 252. The lesson-organizer engine 254 organizes the lessons for teacher to use. In some embodiments, a teacher may provide input at any stage of the planning process, for example, either to the resource-finder engine 252, or to other sections or portions of the planning platform 222, in other instances (as indicated by the arrows (e.g. to the skills-selection engine 248). The lesson-organizer engine 254 may provide information and data to assessment platform 220 or the assignment platform 226.

The learning-progression engine 236 may be adapted to provide input to the assessment platform 220, the planning platform 222, or alternatively, to the assignment platform 226, or the reporting platform 232.

The grading-framework 262 is adapted to receive information from the mastery-maker engine 238 and to the MIRT engine 240. The Grading Framework 4e is also adapted to provide information and data to the Assignment Manager 4d.

The mastery-maker engine 238 is software including routines for providing information and data to the dashboard services 333 of the reporting platform 232. The mastery-maker engine 238 prescribes practice tests (FIG. 14, 1438) and assignments in a particular subject for a target student to assist the target student with mastering a particular subject. Some standards for mastery measurement may be used to track either long-term progress or short-term progress. In some instances, the mastery-maker engine 238 may use general outcome measures (e.g. SAT, ACT etc.) to assess high-level skills (e.g., reading, math, or preparedness for college) or skill mastery measurement that measures more granular sub-skills (e.g. fluent recall of division involving single digit numbers with 8 and 9 as divisors). The mastery-maker engine 238 may be adapted to define clear pass/fail criteria, present a multiple equivalent valid forms that measure the same sub-skill, an ability to measure improvement even if the mastery criteria is not met, a valid underlying skill sequence, and an opportunity to test whether mastered skills are retained at a later date. The mastery-maker engine 238 in some embodiments is adapted to test depth of knowledge. The mastery-maker engine 238 tests a scale of cognitive demand and aligns assessments with standards. For example, Webb's four levels of cognitive complexity include recall and reproduction (level 1), skills and concepts (level 2), strategic thinking (level 3), and extended thinking (level 4). In some embodiments, mastery may be computed by a combination of assessments, instruction, and practice inputs. Assignment forms that contribute to mastery may include practice (contributing to probed consideration), formative assessment (contributing to probed consideration), instruction (contributing to probed mastery), summative (imported data contributing to assessed mastery), and CAT assessment (contributing to assessed mastery). In some embodiments, there are two tiers to probed mastery, including a system tier and an item tier. In some instances, the system tier may include the requisite items, forms, skills sequences, and mastery criteria. The items may include items worked for sub-skills and third-party tagged imported data. In some scenarios, an item % attainment by a student may be computed by an item score/highest possible score for the item. A probed % mastery designation for a student may be computed by a weighted mean for all item % attainments known to the system. The mastery-maker engine 238 in some embodiments may normalize the outcomes form computer-adapted testing with scores from practice tests (FIG. 14, 1438) to create an integrated model that reflects mastery by the target student, which may be compared or positioned within the learning progression data for the target student. The mastery-maker engine 238 may extend actual testing data by intelligent inferencing schemes by deriving relationships of objects within the learning progression.

The MIRT engine 240 is software including routines for binding responses from multiple activities (or assignments or results) received from assessment, instruction, and practice tests into a unified scale, which contributes to determining overall mastery. The MIRT engine 240 may receive information and data from the mastery-maker 338. Both the mastery-maker engine 238 and the MIRT engine 240 provide data flow to the reporting platform 232, specifically, the alert manager 335. The dashboard services 333 and the alert manager 335 provide information and data to the teacher and the exporter engine exports data out of the reporting platform 337.

Figure 4:
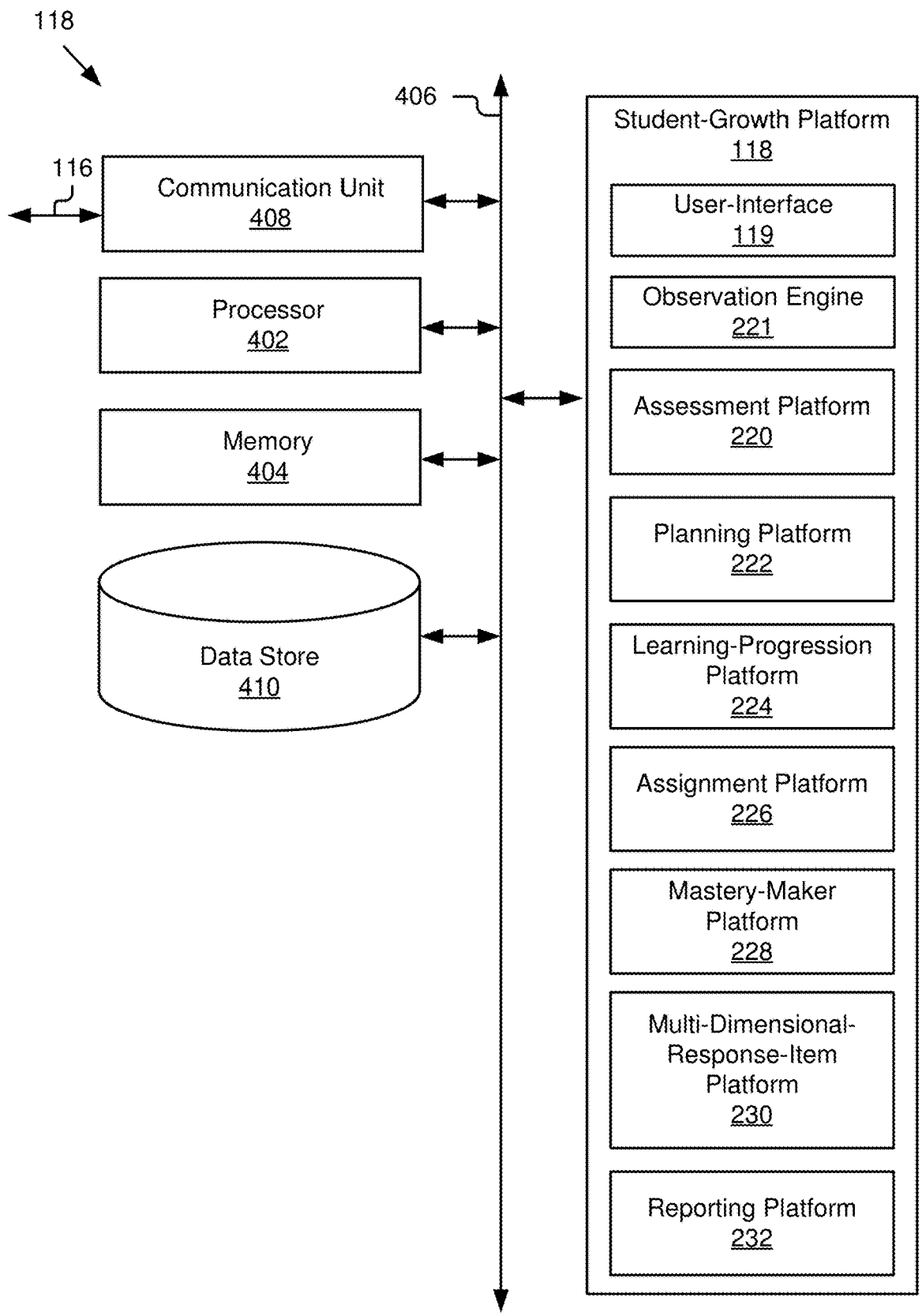
FIG. 4 is a block diagram of the example integrated student-growth platform illustrating its example hardware units including data storage.

FIG. 4 illustrates the various components of the student-growth platform 118 coupled by a bus 406 to a communication unit 408, a processor 402, a memory 404, and a data store 410. The integrated student-growth platform 118 includes the assessment platform 220, the planning platform 222, learning-progression services 224, the assignment platform 226, the master-maker engine 228, the MIRT engine 230, and reporting platform 232.

The processor 202 processes data signals and program instructions received from the memory 204 and the data storage 210. The processor 202 may comprise an arithmetic logic unit, a microprocessor, a general or special purpose controller or some other processor array to perform computations and provide electronic display signals to a display device (e.g., on a user device 106a). The processor 202 is coupled to the bus 206 for communication with the other components. The processor 202 may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included. It will be obvious to one skilled in the art that other processors, operating systems, sensors, displays, and physical configurations than those that are illustrated may be used to perform the operations described in this specification.

The memory 204 may be a non-transitory storage medium. The memory 204 stores the instructions and/or data for operating the student growth platform 118, which may be executed by the processor 202. In one implementation, the instructions and/or data stored in the memory 204 comprises code for performing any and/or all of the techniques or functionalities that are described in this specification. The memory 204 may be a dynamic random access memory (DRAM) device, a static random access memory (SRAM) device, flash memory or some other memory device known in the art.

The data storage 210 stores the data and program instructions that may be executed by the processor 202. In one implementation, the data storage 210 may store the data of various types of users in the web forum. The data storage 210 may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 208 facilitates the communication between the user device 106 (in FIG. 1) and the student-growth platform 118 over the network 102 (in FIG. 1). For example, a user 114a, via the user device 106a, may access the student-growth platform 118 to view or read electronic content and otherwise interact with the student-growth platform 118 and receive information from the student-growth platform 118, via the communication unit 208. The communication unit 208 also displays the content or information either received from or hosted on the student-growth platform 118 to any of the users 114a through 114n.

The communication unit 208 couples the student-growth platform 118 to the network 102 by the signal line 116 (in FIG. 1) and via the bus 206. The communication unit 208 may include network interface modules, which include ports for wired connectivity such as but not limited to USB, SD, or CAT-5, etc. The network interface modules are configured to link the processor 202 to the network 102 that may in turn be coupled to other processing systems. The network 102 (FIG. 1) may comprise a local area network (LAN), a wide area network (WAN) (e.g., the Internet), and/or any other interconnected data path across which multiple devices may communicate. The network interface modules are configured to provide conventional connections to the network 102 using standard network protocols such as TCP/IP, HTTP, HTTPS and SMTP as well as any others that are understood to those skilled in the art. The network interface modules include a transceiver for sending and receiving signals using WIFI, Bluetooth® or cellular communications for wireless communication. Each of the platforms, modules, and/or engines described above may include software or program instructions configured to perform the functionalities described here.

Example Student-Growth Platform 118

The example student-growth platform 118 depicted in FIGS. 4 (and 1A) is provided by way of example and it should be understood that it may take other forms and include additional or fewer components without departing from the scope of the present disclosure. For example, while not shown, in some implementations, the student-growth platform 118 may include input and output devices (e.g., a computer display, a keyboard and mouse, etc.). Additionally, it should be understood that the computer architecture depicted in FIG. 4 is applicable to the other entities of the system 100a (FIG. 1A), such as the media-distribution server 115 and/or the third-party server 117 with various modifications.

The processor 416 includes an arithmetic logic unit, a microprocessor, a general purpose controller, or some other processor array to perform computations and provide electronic display signals to a display device (not shown). The processor 402 may be coupled to the bus 406 for communication with the other components of the student-growth platform 118. The processor 416 may process data signals and may have various computing architectures including a complex instruction set computer (CISC) architecture, a reduced instruction set computer (RISC) architecture, or an architecture implementing a combination of instruction sets. Although only a single processor 216 is shown in FIG. 4, multiple processors may be included. The processor 402 may be capable of supporting the display of images and the capture and transmission of images, performance of complex tasks, including various types of feature extraction and sampling, etc. It should be understood that the student-growth platform 118 could include various operating systems, sensors, displays, additional processors, and other physical configurations.

The memory 404 stores instructions and/or data that may be executed by the processor 402. The memory 404 is coupled to the bus 406 for communication with the processor 402 and the other components of the student-growth platform 118. The instructions and/or data may comprise code for performing any and/or all of the techniques described herein. In particular, the memory 404 includes a non-transitory computer-usable (e.g., readable, writable, etc.) medium, which can be any apparatus or device that can contain, store, communicate, propagate or transport instructions, data, computer programs, software, code, routines, etc., for processing by or in connection with the processor 402. A non-transitory computer-usable storage medium may include any and/or all computer-usable storage media. In some implementations, the memory 404 may include volatile memory, non-volatile memory, or both. For example, the memory 404 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a Blue-Ray™ storage device, a flash memory device, or any other mass storage device known for storing information on a more permanent basis. It should be understood that the memory 404 may be a single device or may include multiple types of devices and configurations.

The communication unit 408 is an interface for sending to and receiving data from other computing devices. In the depicted embodiment, the communication unit 408 is coupled to the network 102 by the signal line 116 and coupled to the bus 406. In some embodiments, the communication unit 408 includes a network interface device (I/F) having ports for wired connectivity. For example, the communication unit 408 includes a CAT-5/6/7 interface, USB interface, or SD interface, etc. The communication unit 408 may also include a transceiver for sending and receiving signals using Wi-Fi, Bluetooth® or cellular communications for wireless communication. The communication unit 408 can link the processor 402 to the network 102 that may in turn be coupled to other processing systems. The communication unit 408 can provide connections to the network 102 and to other entities of the system 100 using standard communication protocols including, for example, TCP/IP, HTTP, HTTPS, etc.

The student-growth platform 118 includes the assessment platform 220, the planning platform 222, the learning progression services 224, the assignment platform 226, the mastery-maker engine 228, and the MIRT engine 230, and reporting engine 232.

In some embodiments, the student-growth platform 118 and/or the assessment platform 220 are sets of instructions executable by the processor 402 to provide their respective functionality. In other embodiments, the student-growth platform 118 and/or the assessment platform 220 are stored in the memory 404 of the student-growth platform and are accessible and executable by the processor 402 to provide their respective functionality. In any of these embodiments, the student-growth platform 118 and the assessment platform 220 may be adapted for cooperation and communication with the processor 402 and other components of the student-growth platform 118.

Example Observation Engine 221

The observation engine 221 is software including routines for facilitating student growth based on observational assessments received from the assessment platform 220. In particular, the observation engine 221 may send, receive and store observation-related data, such as observation data, templates and files including questions and answers tied to performance standards (e.g., standards related to execution, compliance, effectiveness, personalized learning plans, etc.), identify and suggest electronic learning resources (in cooperation with the resource-finder 252) based on observation-related data received, generate reports including analytics and diagnostics about the students and their learning progress, generate performance (e.g., execution, evaluation, compliance, effectiveness, etc.) assessments of the students based on demographics data, observation-related data, achievement data, standards data, student data, teacheroversight data, interaction data, inter-rater reliability data, observer comparison data, or any other data described herein.

In the illustrated embodiment, the observation engine 221 cooperates with the planning platform 222 including the recommendation engine 250, an assignment engine 208, and a reporting platform 232. The observation engine 221 is coupled for communication with the other components of the student-growth platform 118. The observation engine 221 is also coupled to the network 102 via the communication unit 408 for communication with the other entities of the system 100a (and 100b).

In some embodiments, the user-interface 119, the observation engine 221, the assessment platform 220, the planning platform 222, the learning-progression platform 224, the assignment platform 226, the mastery-maker platform 228, the multi-dimensional response platform 230, and the reporting platform 232 are sets of instructions executable by the processor 402 to provide their respective functionality. In other embodiments, the user-interface 119, the observation engine 221, the assessment platform 220, the planning platform 222, the learning-progression platform 224, the assignment platform 226, the mastery-maker platform 228, the multi-dimensional response platform 230, and the reporting platform 232 are stored in the memory 404 of the student-growth platform 118 and are accessible and executable by the processor 408 to provide their respective functionality. In any of these embodiments, the user-interface 119, the observation engine 221, the assessment platform 220, the planning platform 222, the learning-progression platform 224, the assignment platform 226, the mastery-maker platform 228, the multi-dimensional response platform 230, and the reporting platform 232 may be adapted for cooperation and communication with the processor 402 and other components 408, 404, and 410 of the student-growth platform 118.

The observation engine 221 is software including routines for sending, receiving, processing, and storing observation-related data. In some embodiments, the observation engine 221 may provide observation templates to observers for use in observing and assessing other users (e.g., students, also referred to as the targets), receive observation files including observation data reflecting the assessments for particular students, and store the observation files in the data store 113a (FIGS. 1A & 1B) in association with the targets being observed. In some embodiments, the observation engine 221 interacts and cooperates with the user/client application 108a (FIG. 5) to provide the above-noted functionality.

In the illustrated embodiment, the observation engine 221 is coupled to one or more user/client devices 106 (FIGS. 1A & 5) to provide one or more observation templates (FIG. 14) to the user/client devices 106 and to receive observation-related data from the user/client devices 106. In some embodiments, an observation template is an electronic form for assessing the performance of a target student (e.g., generated by the fixed-form engine 205 in FIG. 2A). The observation template may include different header fields for describing the circumstances of an observation session. For example, the observation template may include fields for describing the identity of a target student, the date the observation was performed by an observer (e.g. teacher or administrator), and how the results of the observation should be distributed (e.g., by reports) and stored (e.g., for later use), etc. Additionally or alternatively, the observation template may include assessment fields for describing the performance (e.g., execution, compliance, effectiveness, and/or other qualities) of the target student during the observation, data about prior observational assessments of the target students, data about other observers, etc. In some embodiments, the assessment fields may include data describing predefined questions and user-selectable or user-definable answers; fields for user-definable questions and/or answers; comment fields for providing a description of the target student; rubrics, etc. In these or other embodiments, the assessment fields may state a goal, objective (e.g., for mastery), effectiveness expectation (e.g., projections based on scores), or other metric, and include one or more indicators assessing how the target student is meeting that goal, objective, effectiveness expectation, or other metric. For example, the objective might be "students develop to meet the vision, mission, values, beliefs and goals of the organization (e.g. school), collaboratively determining the processes used to establish these attributes, and facilitating their integration into the life of the organization community," and the selectable indicators assessing whether the student is partially proficient at meeting this goal may state that the vision, mission and values are: "developed through collaborative process," "publically available," part of routine," and "routinely updated" by the target student (i.e., from a particular grade). In this example, if only some of these indicators are met, then the target student is deemed partially proficient at the goal. If all are met, additional indicators evaluating whether a target subject is proficient (as attained a high level beyond that expected), accomplished, or exemplary at meeting this goal are considered and selected if appropriate. The observation templates may also include assignment fields for recommending, assigning and/or integrating electronic resources (e.g., video) by a teacher; and fields for defining assignment parameters for the electronic resources (e.g., task timers, wait times, etc.), as described in further detail below. In some embodiments, suggestions for the assignment fields may be populated in real-time by the assignment platform 226 (particularly, the assignment manager 260) in response to sending the observation data.

The content of the observation templates may be displayed to users via user interfaces generated (FIG. 14) and displayed by the user/client application 108. The user interfaces displaying the content of an observation template to a user (e.g., student, teacher, or administrator) may also provide functionality for completing the various fields of the template. For example, while observing a target subject in the field, an observer or user 114 may interact with interface elements presented by the user/client application 108 to input information about the circumstances of the observation and the target's performance. For example, the observer or user 114 may input the location where the observation session took place; the date and time of the observation session; the identity of the target student's audience (if any); information about the identity of the observer (e.g. teacher or administrator); information about the observer's position and/or relationship to the target student (e.g., subject teacher); options for storing and distributing the results of the observation; etc. The observer or user 114 may also provide input describing the performance of the target student (e.g., teacher comments), such as inputting answers to questions about various aspects of the target student's performance, etc.

In some embodiments, an observation template may include predefined questions and answers for assessing the compliance of a target student with various predetermined requirements. For example, the requirements may be based on institutional policy, compliance with requirements, legislated practices, or industry standards, and the questions may be directed to whether or not a target student is meeting those requirements/standards. In these embodiments, the same template may be used repeatedly by an observer to record his/her observations of a target student over time or of a number of different target subjects. In other embodiments, various different templates may be used for the observational assessments of a target student. The structure and content of the observation templates, or portions thereof, may be user-defined or may be automatically generated by the observation engine 221 using standards data stored in the data store 113a or received from another entity of the system 100a, such as the third-party server 117.

The user/client application 108 may transmit observation-related data including input provided by the observer (e.g., teacher or administrator) during the assessment of the target student to the observation engine 221 for storage. For example, the observer (e.g., teacher or administrator) may instruct the client application 108 to save a completed observation template as an observation file in a local repository, and then transmit it to the observation engine 221 via the network or cloud platform 102 for storage in the data store 113a. The observation file includes the information from the template upon which it is based along with the observations (e.g., evaluations, ratings, compliance assessments, and comments), assignments, and/or other information input by observer (e.g., teacher or administrator) during the observation.

In the illustrated embodiment, the observation engine 221 is coupled via the bus 116 (through the network 102 and bus 121a) to the data store 113a to store and retrieve observation-related data. For example, the observation engine 221 can store and retrieve the observation templates and the observation files received from the user/client application 108. The observation engine 221 can also store, retrieve, and provide organization information associated with observers and target subjects. For example, in the educational setting, the observation engine 221 may access information associated with the organization of the school districts of a state or region; a school district; the schools of a school district; the teachers and administrators of a school district, a school, a subject, etc.; the classes in a district or school; the students of a school district, a school, a class, a subject, a teacher, an administrator, etc., from the data store 113a.

The assessment platform 220 is software including routines for providing the assessments as described above with reference to FIG. 3. The planning platform 222 is software including routines for planning a lesson for a teacher according to the assessments. As illustrated in FIG. 3, the planning platform 222 has the recommendation engine 250, which is software including routines for receiving observation data related to a target student, identifying one or more electronic resources that correspond to the observation data, and for providing data representing the one or more electronic resources for display. In some embodiments, the recommendation engine 250 is coupled via the network or cloud platform 102 to receive observation data from one or more user/client devices 106. The observation data may characterize one or more aspects of a target student's performance during an observation session performed by an observer (e.g. teacher or administrator). In the illustrated embodiment, the recommendation engine 250 is coupled to the data store 113a via the bus 116 (and 121a) to store and retrieve data, and is coupled to the media data store 111 via signal line 127 and the network 102 to store and retrieve data.

In some embodiments, the observation data may accompany a resource request for a list of electronic resources that correspond to the observation data. The recommendation engine 250 may receive the request from a client device 106, and may satisfy the request by identifying one or more electronic resources that correspond to the request, and provide a resource response including a summary of the one or more resources to the user/client device 106 for display to the user 114 of the client device 106. For example, an observer of a target student may provide input reflecting observation data assessing the performance of the target subject, and the client application 108, upon receiving that input, may transmit a request for recommended electronic instructional resources that can be assigned by the observer to the target student to help the target student improve his or her skills in a given area.

In some embodiments, to identify one or more electronic resources that correspond to the observation data accompanying the resource request, the recommendation engine 250 can compare the observation data to metadata associated with electronic resources to identify resources that match the observation data. For example, the recommendation engine 250 can search a resource library database that includes an index or catalog of the electronic resources that are available. For instance, the resource library database can include metadata for each of the electronic resources describing each resource. The metadata can include tags describing various characteristics of an electronic resource, a graphical image of the resource (e.g., a thumbnail), a description of the topic or subject matter that the resources is directed to, an author or authors of the resource, the publisher of the resource, the popularity of the resource including, for example, the number of users who have consumed the resource and the level of their interactivity with the resource, etc. The recommendation engine 250 can query the resource library database using the observation data or aspects thereof to identify resources that have corresponding metadata that match the observation data, either loosely or strictly.

The electronic resources may be distributed among several data stores located across the network or cloud platform 102 or may be stored in a single data store. In the illustrated embodiment, the media store 111 and the data store 113a work cooperatively to store the electronic resources. For example, media objects such as video, audio, e-books, vector-based files, documents, datasets, learning objects, etc., may be stored in the media store 111 and lesson plans, learning progressions, curriculum maps, publications, portfolios, industry standards, etc., may be stored in the data store 113a. In other embodiments, all of the electronic resources may be stored in and accessible from a single information source, such as the media store 111, the data store 113a-n, etc. In any of the foregoing embodiments, the resources stored in the data store may be cataloged, for example, by the recommendation engine 250, in a single resource library database or in resource library databases distributed over the network 102, and the recommendation engine 250 can query the resource library database or resource library databases for information matching various criteria or for information about the resources. In other embodiments, the electronic resources may be prescribed or predetermined in advance and pushed out by the student-growth platform 118 to the observer of a target student for assignment or to the target student directly for consumption.

In some embodiments, the observation data includes data quantifying an observer's assessment of a target student's performance. For example, the observation data may include an answer input by an observer in response to a question about the target student's performance in a particular area, and the answer may quantify how well a target subject is performing. In some embodiments, the answers to questions may be based on predefined performance scales that are defined to the recommendation engine 250 and the recommendation engine 250 may use the answer to determine where the target student lies within that performance scale. For example, a target student's performance in a particular area may be assessed from worst to best using the following identifiers: "unsatisfactory," "needs improvement," "developing," "proficient," and "distinguished," or other such method for scaling a student and if the observation data includes data identifying "unsatisfactory" as the answer to a particular question about a target student's performance in that area, the recommendation engine 250 may use this assessment to identify one or more electronic resources that provide foundational or basic learning in that particular subject area.

If multiple electronic resources are identified by the recommendation engine 250 as corresponding to the observation data, the recommendation engine 250 can rank them based on one or more criteria. A criterion may be any attribute associated with the electronic resources. For example, the criterion may include a topic; the number of times an electronic resource has been interacted with, viewed, listened to, etc.; an author; a publisher; a date of the electronic resource; the number of users connected (or at the same level) to the target student who have interacted with the electronic resource previously; the number of times an electronic resource has been assigned to users having a similar assessment; etc. The recommendation engine 250 can generate the summary of electronic resources based on the ranking performed by it. For example, the top-ranked electronic resource may be listed first in the summary and the lowest-ranked resource may be listed last. In another example, the recommendation engine 250 may limit the summary to a certain number of top-ranked resources. In yet another example, the list of electronic resources may be sorted in order of rank and provided incrementally as needed by the user application 108. In a further example, the recommendation engine 250 may rank the resources by those who have been most impactful/effective for students similar to the target student. For example, the recommendation engine 250 may use demographics, observation, achievement, interaction, standards, student, and/or teacher data, etc. to identify the resources that were the most effective at helping a set of similar target subjects develop professionally. For example, a target student may be a fourth grader who is struggling with maintaining a level appropriate for the grade. The recommendation engine 250, using demographic data and/or profile data, may identify other fourth graders who, based on their respective observation data and/or achievement data, also initially struggled with maintaining the level and who later became proficient at that level, as reflected by their respective observation data and/or achievement data, by watching a learning video(s) on particular subject areas (e.g., math); and the recommendation engine 250 and may recommend this/these videos for assignment/consumption.

The learning-progression platform 224 is software for placing the student in a learning-progression scheme and for following the learning-progression scheme prescribed for a target student. The assignment platform 226 is software including routines for receiving an assignment request requesting an assignment of one or more electronic resources to the target student for completion, and for assigning the one or more electronic resources to the target student based at least in part on the assignment request. In some embodiments, the assignment platform 226 is coupled via the network 102 to receive the assignment request from one or more client devices 106.

The assignment platform 226 may interact with the user/client application 108 to assign various electronic resources to a target student. For example, during an observation of the target student, the observer inputs observational data indicating that the target student is in need of training on a particular skillset, and the recommendation engine 250 provides a summary of electronic instructional/training resources that are accessible via the student-growth platform 118. The observer, using an interface rendered and displayed by the user/client application 108, may assign one or more of the electronic resources to the target student. In response to the assignment, the assignment unit 518 (FIG. 5) of the user application 108 generates and sends and assignment request to the assignment platform 226, which identifies the electronic resource or resources that have been assigned, as further discussed below with reference to at least FIG. 3. The assignment platform 226 then records the assignment of the electronic resources in the data store 113 in association with a user profile for the target student. In some embodiments, an assignment is not activated by the assignment platform 226 until the corresponding observation file including the assignment is finalized and uploaded by the observation unit 516 (FIG. 5) of the user/client application 108. In other embodiments, one or more assignment requests are provided and recorded by virtue of the observation file being uploaded for storage by the user/client application 108 to the student-growth platform 118. For example, upon receipt of the observation file, the assignment platform 226 extracts any assignments from the observation file and records them as described above. In some embodiments, to complete the assignment, the target student, who is a user of the student-growth platform, may be required to access the service and interact with the electronic resource. In other embodiments, to complete the assignment, the target student may be required to consume the electronic resource and then report on his/her implementation of the learning provided by the resource and/or provide his/her reflections on the learning provided by the resource, etc., via the user/client application 108. For example, the target student may be required to submit, via the user/client application 108, input describing his/her experience with trying-out/implementing the principles taught by the assigned resource (e.g., an online learning video). Once this input has been received, the assignment platform 226 may flag the assignment as being completed in the data store 113. Other configurations for completing an assignment are also contemplated.

In some embodiments, the assignment request includes one or more assignment parameters or particulars. Each assignment parameter sets a condition that must be met in order to complete the assignment. For example, an assignment parameter includes a due date, a level of interaction with the electronic resource that is required to complete the assignment, an additional requirement that must be satisfied for completion of the assignment, etc. For instance, the observer may assign a video to the target student to view and may require the target student to write his/her thoughts or reflections about the video by inputting and transmitting them via an interface associated with the student-growth. In the illustrated embodiment, the assignment platform 226 is coupled to the data store 113*a-n* via the bus 116 to store the one or more assignment parameters in association with assignment to which they pertain. In these or other embodiments, one or more assignment parameters can be predefined and stored in the data store 113*a-n*. A predefined assignment parameter can be applicable to all users who are assigned electronic resources, or may be customized for a particular group of users, such as those belonging to a particular school or grade or being observed by a particular observer (e.g., teacher). For example, for all videos that are assigned, a predefined assignment parameter can be set (e.g., by an observer via an associated interface of the student-growth platform 118) requiring that the videos must be viewed to completion in order for the assignments of those videos to be considered satisfied. In another example, predefined assignment parameters can require videos to be viewed to completion in full screen mode with the sound of the video being set at an audible level in order for the assignments for the videos to be considered satisfied.

In some embodiments, the assignment engine 226 generates and sends an electronic notification to the users associated with the assignment request. For example, the assignment engine 226 may send an email to the target subject and/or the observer(s) summarizing the assignment. The email may include a description of the electronic resource and an electronic link (e.g., a hyperlink including the uniform resource locator (URL) of the electronic resource) for directing the reader directly to the electronic resource. The email may also describe any assignment parameters, such as when the assignment must be completed by. In another example, the assignment platform 226 may send a similar message to the user via an internal messaging system, an instant-messaging system, a text-messaging system, or any other electronic-messaging system. In these embodiments, the assignment platform 226 is coupled to the data store 113a-n to access information about the electronic resource and to store a copy of the electronic notification that was sent.

The mastery-maker platform 228 is software including routines for enabling mastery of a particular subject. The details are described above with respect to FIG. 3. The multi-dimensional response platform 230 is software including routines for binding various responses.

The reporting platform 232 is software including routines for generating and sending reports. The reporting platform 232 may use the data stored/and or aggregated by the student-growth platform such as achievement data, demographics data, student data, teacher data, observation-related data, interaction data, standards data, or any other data described herein, to generate the reports. For example, the reporting platform 232, using the data aggregated and stored by the observation engine 221 and/or student-growth platform 118, may generate/segment/organize a report by region, district, school, class, teacher, student(s), class-size, gender, ethnicity, public policy, legislation, standards, requirements, etc. In a further example, the reporting platform 232 may process this data to make macro and/or micro qualitative assessments for inclusion in one or more reports. For instance, the reporting platform 232, based on the observation-related data, demographics data, achievement data, student data, teacher data, interaction data, and/or standards data, etc., may generate an aggregate effectiveness score for a region, body, or group, and/or individual effectiveness scores for each of the students/teachers of that region, body, or group. The reports may be generated by the reporting platform 232 to include any type of data including textual, graphical, video, audio, and vector-based data to provide rich, qualitative and quantitative analysis of the target subject(s), observer(s), and associated organization(s) or businesses(s), including their performance (e.g., execution, effectiveness, compliance, problem-areas, etc.).

In some embodiments, the reporting platform 232 may analyze two or more data types, such as observation-related data, achievement data, and/or student data related to the target subject, to generate an effectiveness rating for that target subject. Analyzing two more data types to generate an effectiveness rating is advantageous as it can provide a more reliable effectiveness rating for a target subject compared to an effectiveness rating generated from a single data type. For instance, the observation data for a given teacher may reflect, for a particular evaluation period, that the teacher received a rating of "proficient" for four of the metrics evaluated and a "needs improvement" rating for three of the metrics. However, during this same evaluation period, the student data may reflect that the students of this teacher gave the teacher a "proficient" or "excellent" rating in every category surveyed, and the achievement data for these students may reflect standardized test scores, which meet or exceed legislative requirements. As a result, the effectiveness rating generated by the reporting module 210 can balance the "needs improvement" ratings against the positive survey and test score results to produce a more accurate overall "effectiveness" rating for the teacher. In other examples, the reporting platform 232 may determine the assessments of the target subject described by each data type as being consistent, and as providing further evidence/support for a particular effectiveness rating.

In some embodiments, the reporting platform can generate a report based at least in part on the receipt of interaction data describing an interaction between the target subject and the at least one electronic resource that was assigned. The reporting platform 232 may be coupled to the resource-finer engine 252 (FIG. 3), the memory 404, and/or the data store 113a-n to receive the interaction data. For example, to generate a report, the reporting platform 230 may analyze user behavior in interacting with one or more electronic resources provided by the resource-finder engine 252, and generate a report summarizing and/or detailing this analysis. In particular, when a user consumes an electronic resource, the resource-finder engine 252 of the student-growth platform 118 may receive and store interaction data describing the interaction in the data store 113a-n in association with a user profile associated of the user, and the reporting platform 232 may access the interaction data to analyze the user interaction and results and generate a report describing the user interaction and results.

For example, when a user accesses an electronic resource, pages through an electronic book, downloads files included with or embedded in a webpage, complete a survey associated with any electronic resource, views a video file, listens to an audio file, comments on passages of an interactive electronic book, submits lesson plans, submits curriculum maps, downloads documents, uploads files including video, audio, text, graphics, etc., participates in communities, groups defined by his/her social connections, or otherwise uses any other functionality provided by the user/client application 108 (e.g., see FIG. 5) to interact with an electronic resource. The student-growth platform 118 the receives interaction data describing these interactions from the user/client application 108 or another entity of the system, such as the media-distribution server 117, and stores interaction data describing the interaction in the data store 113a-n. In another example, if an observer assigns a target student the task of watching a video on achieving effective scores via the student-growth platform 118, the reporting platform 232 can generate status updates about the target student's progress on watching the video and sending them to the observer (e.g. teacher). The reporting platform 232 can also report on the target student's additional efforts to develop his/her skills by reporting on what other electronic learning resources the target student has consumed since the observer made the assignment, provided the target student provides his/her consent for doing so via an associated privacy settings interface.

In some embodiments, the reporting platform 232 generates a report in response to receiving a trigger signal. In some embodiments, the trigger signal may be generated by the student-growth platform 118 upon the completion of an assignment by a target user and transmitted to the reporting module 232. In other embodiments, the trigger signal may be generated in response to a request for a report, for example, from a user of the student-growth platform via an associated user interface. For example, an observer who observed a target student and assigned the target student one or more electronic resources may input a command into his/her user device 106 via the user application 108 commanding that a report be generated describing the target student's progress on completing the assignment. Responsive to receiving the command, the user application 108 may generate and send a report request via the network 102 to the reporting platform 232, thus triggering the reporting platform 232 to generate and send the report for display to the target student, observer, an administrator, a combination of the foregoing, etc.

In other embodiments, the reporting platform 232 may automatically generate the report at certain intervals, times, etc. For example, the reporting platform 232 may automatically generate reports for all outstanding assignments and send them to the administrator and/or observer users 114 who oversee the target students that the outstanding assignments correspond to. In some embodiments, the reporting platform 232 may transmit the report to the user application 108 for display to the user 114, provide the report for download as a portable document, transmit the report via electronic message (e.g., via email) to one or more other users 114 associated with or responsible for the target subject, etc.

The reporting module 232 is also capable of analyzing the performance/effectiveness of an observer/student, and generating and providing a report describing the observer's/student's effectiveness/performance to the observer and other users 114, such as an administrator of the observer. In some embodiments, to analyze the effectiveness/performance of the observer/student, the reporting platform 232 compares achievement data and observation-related data associated with the target to determine if the performance assessment of the target reflected by the observation-related is accurate and consistent. The achievement data can include any type of achievement data associated with the target. For example, depending on the target student's performance, the achievement data may include test scores for the target, reviews by teachers, performance reviews, compliance with requirements/standards, etc. The observation data can include any data associated with the performance assessments made by an observer, such as the observation files associated with the observer and/or target students observed by the observer. In these or other embodiments, the reporting platform 232 can track the observational assessments performed for the target student and compare them for consistency based on substance, frequency, etc.

Based on the observation-related and achievement data, the reporting module 232 can determine the accuracy and consistency of a performance assessment (e.g., execution, effectiveness, compliance, performance, trending, and other metrics, etc.) of the target students. In some embodiments, the reporting module 232 can analyze the achievement data to determine an achievement-based performance assessment for the target student; can analyze the observation-related to determine an observation-based performance assessment for the target student; and compare the achievement-based and the observation-based performance assessments to further determine if the observation-based performance assessment of the target student is accurate/consistent. In other embodiments, the reporting platform 232 may compare the observational assessments by one observer of a target student to the observational assessments of the same target student by other previous observers to determine the accuracy of the observer's assessments. For example, if an observational assessment of a target student by a first observer is grossly inconsistent with the observational assessments of that target student by other observers on the same or similar subject matter, the observational assessment of the first observer may be flagged and reported to an administrator of the observer for further review/scrutiny.

In some embodiments, the accuracy of the observation-based performance assessment can be determined based on whether the achievement-based and the observation-based performance assessments are consistent. For example, the reporting platform 232 may determine the observation-based performance assessment to be inaccurate if the observation-based performance assessment is negative and the achievement-based performance assessment is positive, or conversely, if the observation-based performance assessment is positive and the achievement-based performance assessment is negative.

Further, the reporting platform 232 may determine the observation-based performance assessment to be accurate if both the observation-based performance and achievement-based performance assessments were negative or positive. However, if the both the observation-based performance and the achievement-based performance assessments were neutral, the reporting platform 232 may report that the accuracy of the performance assessment made the by the observer could not be verified.

The reporting platform 232 can generate a report describing the determination it made about the accuracy of the observer's performance assessment of a target subject and provide the report for display to the observer(s) or one or more other users, such as an administrator of the observer(s). In some embodiments, the reporting platform 232 can generate the report in response to receiving a request from a client device 106 of an administrator/user 114 who oversees the observer. In other embodiments, the reporting platform 232 can automatically generate and send the report to the administrator via an electronic message, such as an email, an internal messaging application provided by the student development application, a text message, etc.

In some embodiments, the accuracy of all of the observer's performance assessments of a particular target student or multiple target students may be determined by the reporting platform 232 and included in the report. For example, the observer's overall accuracy in performing the observational assessments may be computed over time by the reporting platform 232 to determine if the observer is consistently inaccurate with his/her observations. Additionally, the reporting platform 232 may compare the accuracy of one or more of an observer's assessments of a target student to the assessments of that target student by other observers to determine whether they are consistent. If not, information describing the inconsistencies may be included in the report.

The reporting platform 232 may also determine whether an observer is properly performing the observational assessments and can include this determination in the report. In some embodiments, the reporting platform 232 may analyze the observation files for some or all target students observed by the observer to determine the level and quality of feedback provided by the observer about those students. For example, if the reporting platform 232 determines that the assessments (e.g., answers, ratings, comments, etc.) for the target students made by the observer in the observation files are all the same or substantially similar, the reporting platform 232 may determine that the observer is simply making the same assessments for each target student and is not performing the assessments as required. The reporting platform 232 may also make a determination as to the quality of one or more assessments performed by an observer based on the level and/or variety of feedback included in the observation file(s) for one or more target students.

The reporting platform 232 may store any reports and/or data generated by it in the data store 113a-n for later access by the reporting platform 232 or any other component of the student-growth platform 118, such as an administrative module (not shown) of the student-growth platform 118 that provides administrator/users access via the client application 108 to statistics and reports about the users 114 of the student-growth platform 118 that the administrator oversees.

In the depicted embodiment, the reporting platform 232 is coupled to the data store 113a-n via the bus 116 via the network/cloud platform 102 and the third-party server 117 to receive the achievement data. For example, the reporting platform 232 can periodically retrieve the achievement data from the third-party server 117 via an API and store it locally in the data store 113a-n for later access or use. In another example, the reporting platform 232 can retrieve the achievement data real-time via the API for analysis and compare it to the observation-related data from the observation file. However, in other embodiments, the reporting platform 232 may retrieve the achievement data from any information source communicatively coupled to the student-growth platform 118 or network 102 via the network.

The reporting platform 232 provides numerous additional advantages including providing the target student a mechanism for reporting on the completion of an assignment, providing an observer/user a mechanism to monitor whether the target student(s) he/she observes completes the assignments assign to them, analyzing and reporting on an student's performance and work quality, determining/rating effectiveness of target students, etc.

Additional functionality of the student-growth platform 118 and its observation engine 221, and their corresponding components are further described below.

Example Client Device 108

Figure 5:
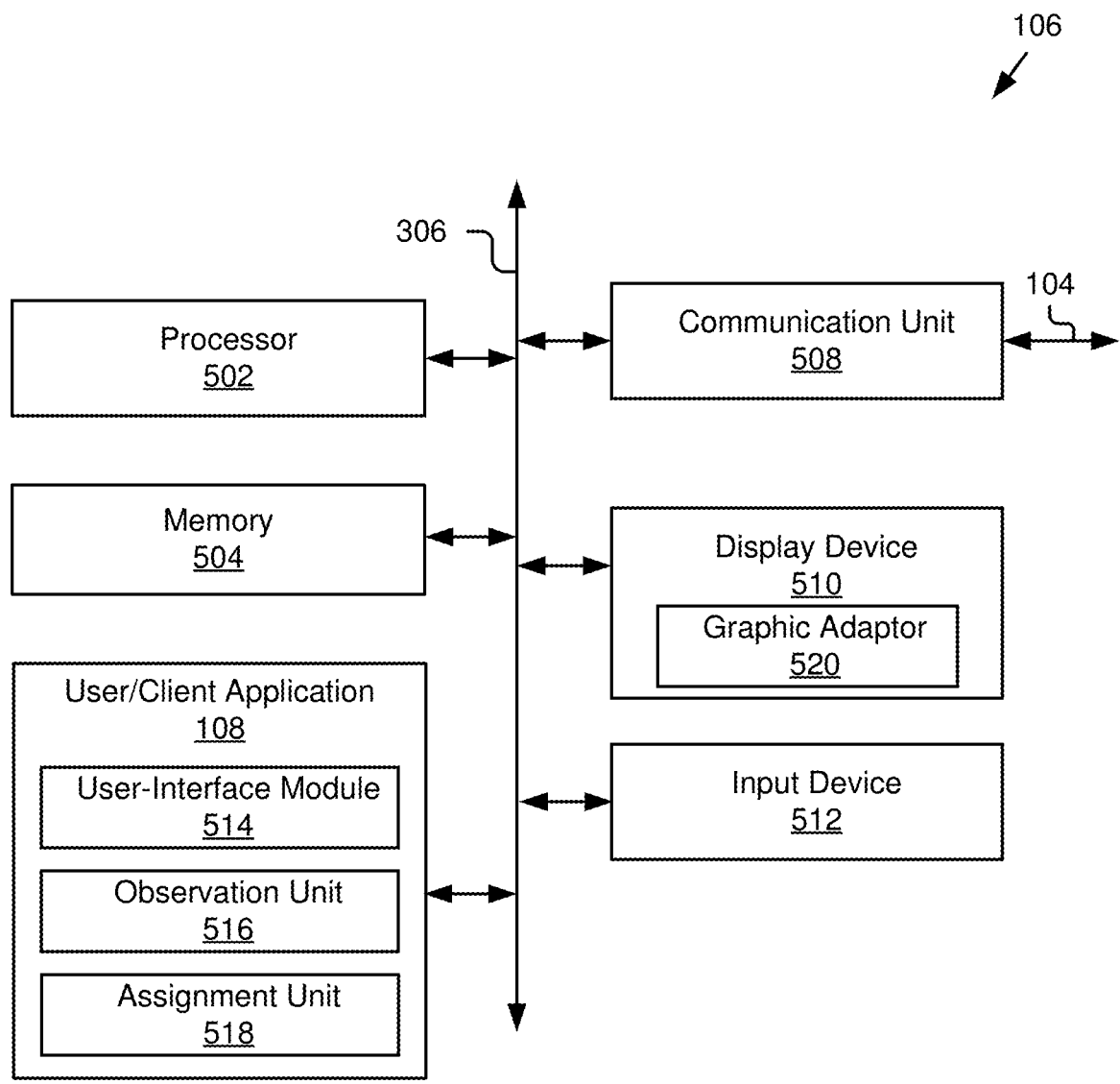
FIG. 5 is an example hardware configuration of an example user device that interacts with the student-growth platform.

FIG. 5 is a block diagram of an example user/client device 106. In the depicted embodiment, the client device 106 includes a client application 108. The client device 106 also includes a communication unit 308, a processor 302, a memory 304, a display device 310 with a graphics adapter 320, a display 318, and an input device 312, which are communicatively coupled via the bus 306. In some embodiments, the functionality of the bus 306 may be provided by an interconnecting chipset.

The communication unit 308 includes interfaces for interacting with other devices/networks of devices. In some embodiments, the communication unit 308 includes transceivers for sending and receiving wireless signals. For example, the communication unit 308 includes radio transceivers (4G, 3G, 2G, etc.) for mobile network connectivity, and radio transceivers for WiFi and Bluetooth® connectivity. In these or other embodiments, the communication unit 308 may include a network interface device (I/F), which includes ports for wired connectivity. For example, the communication unit 308 may include a CAT-type interface, USB interface, or SD interface, etc. In the depicted embodiment, the communication unit 308 is coupled to the network 105 (FIG. 1) by the signal line 104a-n.

The processor 302 comprises an arithmetic logic unit, a microprocessor, a general purpose controller, or some other processor array to perform computations and optionally provide electronic display signals to the display device 310. The processor 302 may communicate with the other components via the bus 306. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 5, multiple processors may be included. The client device 106 also includes an operating system executable by the processor 302 as discussed elsewhere herein, for example, with reference to FIG. 1.

The memory 304 stores instructions and/or data that may be executed by processor 302. The memory 304 communicates with the other components of client device 106 via the bus 308. The instructions and/or data comprise code for performing any and/or all of the techniques described herein. In particular, the memory 304 includes a non-transitory computer-usable (e.g., readable, writable, etc.) medium, which can be any apparatus or device that can contain, store, communicate, propagate or transport instructions, data, computer programs, software, code, routines, etc., for processing by or in connection with the processor 302. A non-transitory computer-usable storage medium may include any and/or all computer-usable storage media. In some implementations, the memory 304 may include volatile memory, non-volatile memory, or both. For example, the memory 304 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing information on a more permanent basis. It should be understood that the memory 304 may be a single device or may include multiple types of devices and configurations. In some embodiments, the user/client application 108 is stored in the memory 304 and executable by the processor 302.

The display device 310 represents any device equipped to present output signals generated and provided by the user/client device 106. In some embodiments, the display device 310 displays electronic images and data including, for example, user interfaces and formatted information. For example the display device 310 may be any conventional display device, monitor or screen, such as an organic light-emitting diode (OLED) display, a liquid crystal display (LCD), an e-ink display, etc. In some embodiments, the display device 310 is a touch-screen display capable of receiving input from one or more fingers of a user/client 106. For example, the display device 310 may be a capacitive touch-screen display capable of detecting and interpreting multiple points of contact with the display surface. In some embodiments, the display device 310 may be coupled to the bus 306 via a graphics adapter 320 (shown within the display device 310, but also may be configured outside), which generates and provides display signals to the display device 310. The graphics adapter 320 may be a separate processing device including a separate processor and memory (not shown) or may be integrated with the processor 302 and memory 304.

The input device 312 represents any device for inputting data on the client device 106. In some embodiments, the input device 312 is a touch-screen display capable of receiving input from the one or more fingers of the client/user 106. The functionality of the input device 312 and the display device 310 may be integrated, and a user/client 106 of the client device 106 may interact with the client device 106 by contacting a surface of the display device 310 using one or more fingers. For example, the user/client 114a-n may interact with an emulated (i.e., virtual or soft) keyboard displayed on the touch-screen display by using fingers to contacting the display device 310 in the keyboard regions. In other embodiments, the input device 312 is a separate peripheral device or combination of devices. For example, the input device 312 includes a keyboard (e.g., a QWERTY keyboard) and a pointing device (e.g., a mouse or touchpad). The input device 312 may also include a microphone (e.g., for voice input) or other known peripheral devices.

Example User/Client Application 108

Referring now to FIG. 5, the user/client application 108 is software including routines for sending and receiving data to the other entities of the system, including, for example, the student-growth platform 118, the media-distribution server 115, and the third-party server 117. In some embodiments, the user/client application 108a is a web browser application for accessing the resources provided by the student-growth platform 118 and the media-distribution server 115. For example, the student-growth platform 118 operated by the in cooperation with the media-distribution server 115 may be a web-based service and the user/client application 108 may access various electronic resources provided by the service via uniform resource locators (URLs). In other embodiments, the user/client application 108a is an application customized specifically for accessing the student-growth platform 118, and more particularly, for cooperating and interacting with the observation engine 119.

In the depicted embodiment, the user/client application 108 provides a user 114a-n (e.g., an observer) interacting with the client device 106 mechanisms for inputting viewing, adding, modifying, deleting observation-related data related to one or more other users/clients 114a-n. The user/client application 108 may cooperate with the observation engine 221 (FIG. 1A) to conveniently store and retrieve observation templates and files for viewing by the user. The user/client application 108 may, in some embodiments, send a resource request to the observation engine 221 to identify and provide recommended electronic resources that can be assigned to a user. The user/client application 108 may also send a request to the reporting module 232 (FIG. 1A) to provide observation-related statistics and reports for display to the user 114a-114n via a report interface generated by the user-interface module 514 of the user/client application 108.

In the illustrated embodiment, the user/client application 108 includes a user-interface module 514, an observation unit 516, and an assignment unit 518. The observation unit 516, the assignment unit 518, and the user-interface module 514 are communicatively coupled with each other and the other components 502, 504, 508, 510, and 512 of the client device 106. The components are also coupled to the network 102 via the communication unit 508 (and line 104) for communication with the other entities of the system 100a. While not shown, in some embodiments, the user/client application 108 may include an authentication or verification module for authenticating the user 114a-n to access the student-growth platform 118.

In some embodiments, the user/client application 108, the user-interface module 514, the observation unit 516, and/or the assignment unit 518 are sets of instructions executable by the processor 502 to provide their respective functionality. In other embodiments, the user/client application 108, the user-interface module 514, the observation unit 516, and/or the assignment unit 518 are stored in the memory 504 of the client device 106 and are accessible and executable by the processor 502 to provide this functionality. In any of these embodiments, the user/client application 108, the observation unit 516, the assignment unit 518, and/or the user-interface module 514 may be adapted for cooperation and communication with the processor 502 and other components of the user/client device 106.

In some embodiments, the observation-related data managed by the user/client application 108 may be locally stored in the memory 504, remotely stored in any of the data stores 113a-113n (via signal lines 121a-121n), the third-party server 117, or may be stored in any combination of the forgoing thereof. For example, an instance of the observation-related data may be stored locally on the user/client device 106 and remotely on the student-growth platform 118, and the client/user application 108 may synchronize the information via the network 105, either continuously or periodically, as the information changes. In some embodiments, the user/client application 108 may be a stand-alone application or may be integrated into another application operable on the user/client device 106.

The observation unit 516 is software including routines for sending and receiving observation-related data to the observation engine 221 (FIG. 1A), cooperating with the interface engine 306 to display observation-related information to a user, and cooperating with the user-interface unit 119 to receive observation-related input from the user/client. In some embodiments, the observation unit 516 interacts with the observation engine 221 to receive observation templates and observation files for display to the user 114a-n of the user/client device 106 and to send observation files to the observation engine 221 for processing and/or storage in the data store 113a-n, as discussed above with reference to at least FIG. 1A.

In some embodiments, the observation unit 516 can cooperate with the observation engine 221 via the network 102 to provide information about target students to an observer and provide functionality to the observer for assessing and tracking the performance and development of the target students. The observation unit 516 may also interact with the user-interface module 514 to provide administrative tools such as a reporting tool for viewing statistics and other analytical data, and/or an observational tool for assessing the performance of students, assigning instructional resources to students, and tracking completion of the assignments given to them. In some embodiments, the observation unit 516 interacts with the user-interface module 514 to display observation templates and files to a particular user, as discussed with reference to at least FIG. 14 below.

The observation unit 516 may be coupled to the user-interface module 314 to receive user input and display the information to the user 1114a-114n via user interfaces generated by the user-interface module 514, such as the observation interface discussed with reference to FIG. 14 below. For example, the observation unit 514 may send interface signals to the user-interface module 314, and responsive to receiving these signals, the user-interface module 314 may generate and display user interfaces that correspond to the instructions carried by the interface signals. In another example, the user-interface module 314 may receive input signals from a user via the input device 312 and send those signals to the observation unit 314 for processing. In some embodiments, in cooperation with the user-interface module 314, the observation unit 314 can receive user-related and observation-related information and display the data to the user, display observation templates to the user, populate observation templates with user input, save observation files based on the observation templates, transmit observation-related data such as observation files to the observation engine 221 or storage, receive observation-related statistics and reports and organize and display them to the user, receive electronic resources for assignment, consumption, etc., by the user, receive electronic communications from other users via the network 102 and display them to the user, etc. In some embodiments, an observer may, via a user interface rendered by the user-interface module, preselect options and/or be guided similarly in designing observation templates and appropriate follow-up activities.

In some embodiments, the user-interface module 514, in cooperation with the observation unit 316, may generate a report dashboard/interface for viewing reports generated and provided by the reporting module 232 (FIG. 1A) and received by the observation unit 514. This dashboard provides numerous advantages including providing an observer or administrator with detailed information about a given target student's performance (e.g., execution, effectiveness, compliance, etc.) over time. For example, the observer may be a teacher and may need to interact with a number of students to perform observational assessments of each of them. For each student, the teacher may, using the dashboard, access any previous observational assessments of that student; view an overall performance (e.g., execution, effectiveness, compliance, etc.) rating/summary of that student (scores assigned); view the performance (e.g., execution, effectiveness, compliance, etc.) ratings/summaries of that student over time; view statistics across all observational assessments of that student or a subset, such as the observational assessments performed for that academic year; may quickly ascertain the areas a student has had problems with or has been working on, or the areas the student has been improving on; review the test scores for the students, evaluations of the student; view the electronic training resources the student has consumed/interacted with; view any work-product, lesson plans, videos, presentation, etc., the student has uploaded, the learning communities and groups the student has interacted with, any mentors the student has been working with, etc. Using this information, the teacher may quickly get up-to-speed on where the student is at, thus provide pertinent and relevant observations (e.g., evaluations, ratings, suggestions, comments, etc.) and assignments, etc., during the observation session to be performed.

The assignment unit 518 is software including routines for generating and sending resource requests, receiving resource responses including one or more electronic resources identified by the assignment platform 226, and assigning one or more electronics resources to a user. In some embodiments, the assignment unit 518 cooperates and interacts with the assignment platform 226 to identify one or more electronic resources that can be assigned to a user, as discussed above with reference to at least FIG. 1A.

The assignment unit 518 is coupled to the user-interface module 514 to receive user input and provide information to the user/client 114a-n via user interfaces generated by the user-interface module 514. In some embodiments, responsive to receiving user input signals, the assignment unit 518 can generate a resource request or an assignment request. In some embodiments, the input signals may specify which electronic resource(s) is/are being assigned and the user the resource(s) is/are being assigned to. For example, an observer performing and observation of a target student, may select one or more of the videos identified by the recommendation engine 250 (FIG. 2A) and displayed via the user-interface module 514, such as the observation interface 1400 illustrated in FIG. 14. The assignment unit 518 may also assign supplemental instructional, prescriptive and/or discipline-related resources in response to one or more of these resources being assigned by an observer (e.g., after receiving a report about an initial assignment). In some embodiments, the assignment unit 518 assigns one or more of these resources by generating and sending an assignment request and receiving an assignment confirmation as discussed elsewhere herein. In addition, the assignment unit 518 may provide tools/functionality to the observer to provide the target student with feedback, follow-up with the target student about an assignment or an aspect observational assessment performed, provide recommendations of additional electronic resources to assign to the target subject upon completion of an initial assignment by the target student, etc.

The user-interface module 514 is software including routines for rendering user interfaces and for receiving user input. The user-interface module 514 may be coupled to the input device 512 via the bus 506 to receive input signals from the user 114a-n. For example, an observer/user 114a-n can select an answer to an observation-related question using the input device 512, and the user-interface module 514 receives signals describing the answer. The user-interface module 514 may store the input signals in the memory 504 for retrieval by the other elements of the client application 508, such as the assignment unit 518, or may provide the signals directly to the other elements of the user/client application 108.

The user interfaces generated by the user-interface module 108 include interfaces for inputting, modifying, and deleting information, displaying notifications, rendering video, displaying images and text, displaying vector-based content, sending and storing information, etc. In some embodiments, the user interfaces include user interface elements that allow users/clients 114a-n to interact with the user/client device 106 and input information and commands, such as text entry fields, selection boxes, drop-down menus, buttons, virtual keyboards and numeric pads, etc., as further discussed below with reference to FIG. 14.

Example Methods

Referring now to FIG. 4, an example method 400 for prescribing electronic resources based on observational assessments is described. The method 400 begins by identifying 402 one or more electronic resources based on observation data. In some embodiments, the recommendation engine 206 identifies 402 the one or more electronic resources by querying a library of electronic resources for resources that match one or more aspects of the observation data. If a plurality of electronic resources is identified, the recommendation engine 206 can rank and filter the electronic resources and thus recommend which electronic resources are the most suitable for a target subject. Next, the method 400 provides 404 a summary of the one or more electronic resources to an observer, such as a supervisor or evaluator, for assignment to subject that he/she is observing. For example, the client device 126 of the observer may receive a summary of training videos or other resources identified and ranked by the recommendation engine 206 and may display the summary to the observer via a user interface. The observer may use the interface to preview the videos or other resources and/or assign one or more of the videos or other resources to the target subject.

Next, the method receives 406 an assignment of one or more electronic resources. In some embodiments, the assignment engine 208 receives an assignment request describing the one or more electronic resources that are to be assigned to the target subject by the assignment engine 208. The method 400 continues by associating 408 the assignment of the one or more electronic resources with the target subject. In some embodiments, to associate the assignment, the assignment engine 208 stores the assignment request or information therefrom in the data store 210 in association with the a user profile of the target subject. The method 400 is then complete and ends.

Figure 6:
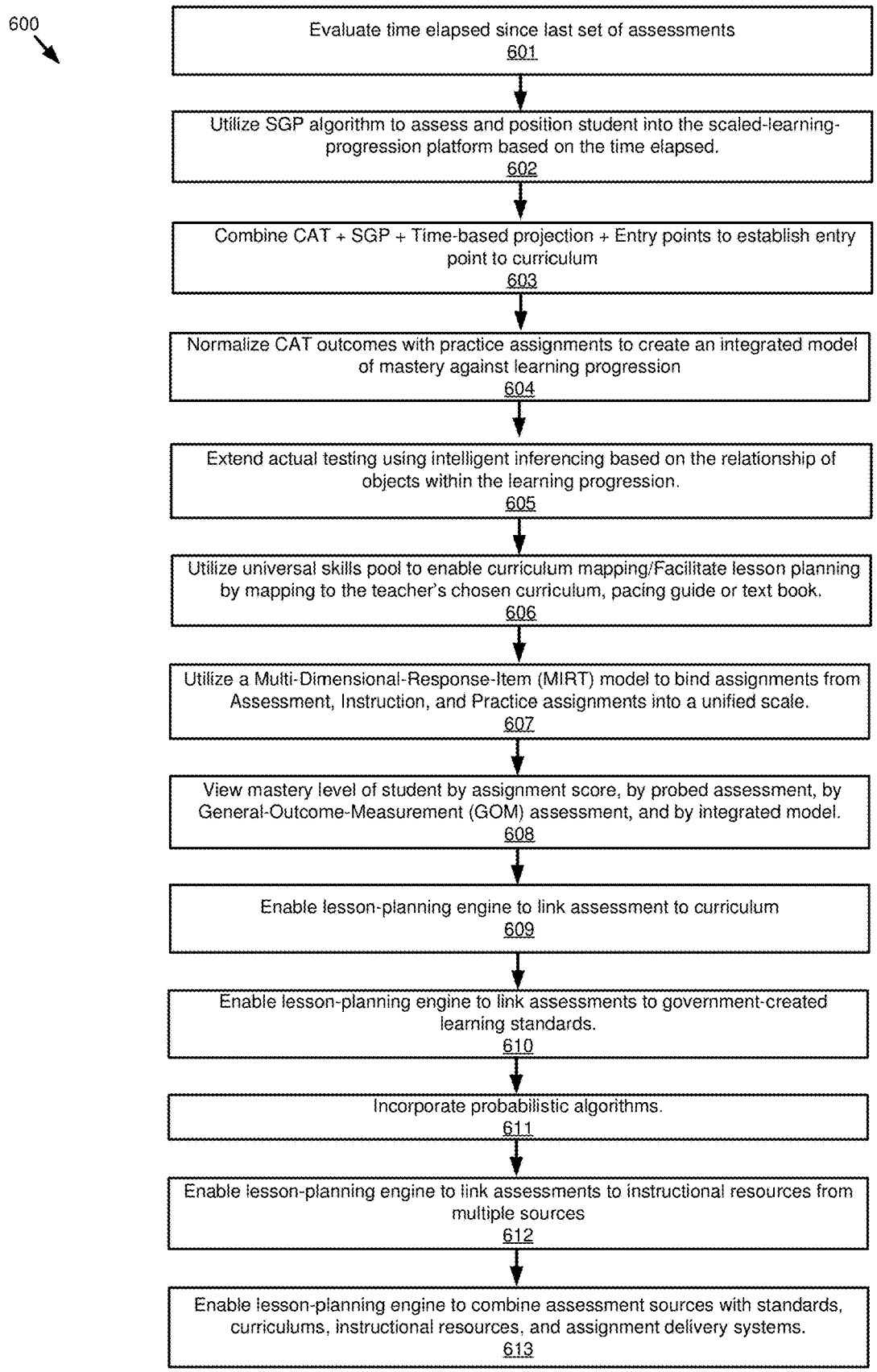
FIG. 6 is a flow chart illustrating an example overall method of student growth according to a prescribed plan generated by the student-growth platform.

FIG. 6 describes an example method 600 for the developing student growth. The method 600 begins at 601, including one or more operations for evaluating the time elapsed since a last set of assessments for a student were generated. The method 600 proceeds to 602, including one or more operations for utilizing the smart-gradient project (SGP) algorithm to assess and position a student (or student group) into the scaled learning-progression platform based on the time elapsed. The method 600 proceeds to 603, including one or more operations for combining the computer-adapted-testing (CAT)+SGP+time-based projection+ entry points to establish the entry point to curriculum. The method 600 proceeds to 604, including one or more operations for normalizing the CAT outcomes with practice assignments to create an integrated model of mastery against the learning progression. The method 600 proceeds to 605, including one or more operations for extending actual testing using intelligent inferencing based on the relationship of objects within the learning progression. The method proceeds to 606, including one or more operations for utilizing universal skills pool to enable curriculum mapping to facilitate lesson planning by mapping to the teacher's chosen curriculum, pacing guide or text book. The method 600 proceeds to 607 utilizing a multi-dimensional response item model to bind assignments from assessment, instruction, and practice assignments into a unified scale. The method 600 proceeds to 608, including one or more operations for viewing mastery level of students by assignment score, by probed assessment, by general-outcome-measurement (GOM) assessment, and by integrated models. The method 600 proceeds to 609, including one or more operations for enabling the lesson-planning engine to link assessment to curriculum. The method 600 proceeds to 610, including one or more operations for enabling the lesson-planning engine to link assessments to government-created learning standards. The method 600 proceeds to 611, including one or more operations for including probabilistic algorithms. The method 600 proceeds to 612, including one or more operations for enabling the lesson-planning engine to link assessments to instruction resources from many sources. The method 600 proceeds to 613, including one or more operations for enabling the lesson planning-engine to combine assessment sources with standards, curriculums, instructional resources, and assignment delivery systems. The instructions resources include metadata for electronic resources, such as audio files, video files, vector-based files, electronic books, electronic publications, spreadsheets, word processing documents, presentational slides, etc. In some embodiments, the electronic resources may be derived from storage in the data store 410 and/or the media data store 111 along with metadata describing the contents and characteristics of the electronic resources. In other embodiments, metadata for the electronic resources are derived from the electronic resources themselves, for example by parsing header information included in the electronic resources. In some embodiments, the instructional materials may be retrieved from a resource library database updated to include the metadata for the electronic resources, including for example, data describing the content and characteristics of the electronic resources and their stored location.

At 612, the lesson-planning engine receives observation data reflecting an observational assessment generated for a target student. In some embodiments, the observation data reflects an answer to a question from an observation template. For example, the observation data can describe how the target subject is performing with reference to a particular skill, requirement, standard, etc. Using the metadata associated with the electronic resources, the method 600 queries for one or more electronic resources that match the observation data. The match can be loose and allow electronic resources that generally pertain to the observation data to be identified, or may be strict and require that the electronic resources be precisely directed to the assessment reflected in the observation data. For example, if the target student is identified as lacking in his or her ability in a particular area, a loose match may identify resources generally related to what is lacking, and a strict match may identify resources that specifically relate to what is lacking.

Figure 7:
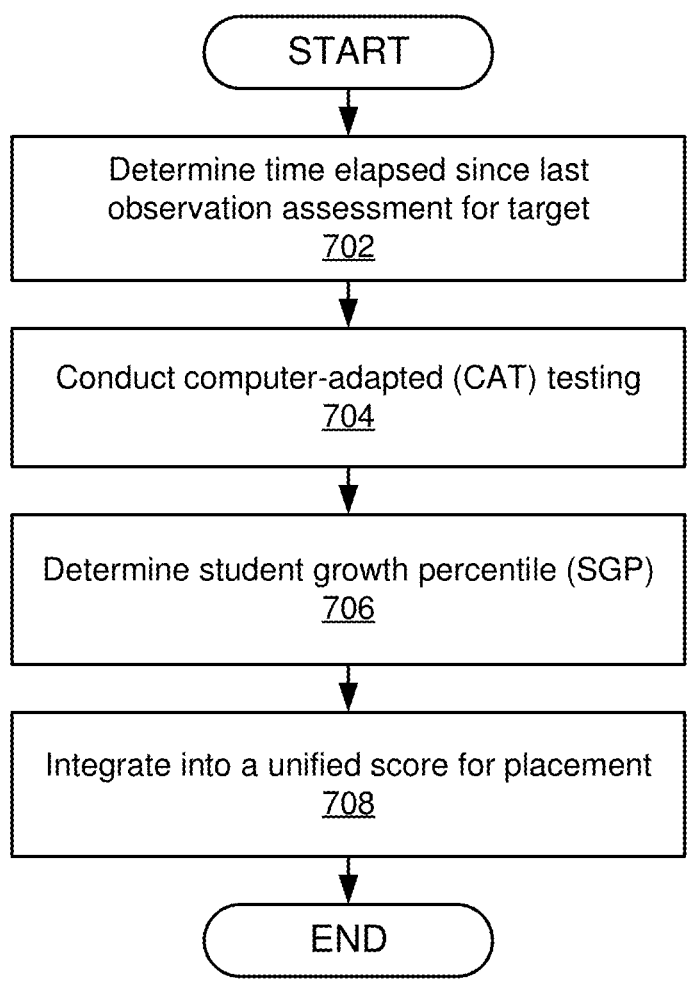
FIG. 7 is a flow chart illustrating an example method of assessment.

FIG. 7 describes an example method of assessing target students. The example method 700 begins at 702 with determining the time elapsed since a last observation assessment for a target student. The method 700 proceeds to 704 for conducting computer-adapted testing for the student determine the educational level of the target student. The method 700 proceeds to 706 for determining the student growth percentile. It should be recognized that a student growth percentile, or SGP, compares a student's growth to that of his or her academic peers nationwide. Academic peers are students in the same grade with similar achievement history on standardized assessments. The SGP is reported on a 1-99 scale, with lower numbers indicating lower relative growth and higher numbers indicating higher relative growth. For example, a SGP score of 90 means the student has shown more growth than 90 percent of students. The percentile rank (PR) and student growth percentile (SGP) are very different metrics has a PR is an achievement score that describes a single point in time and a SGP is a growth measure that explains student growth between different points in time. Both measures are norm-referenced, but they have different norming groups. The norming group for PR is all students in a particular grade level. The norming group for SGP is each student's own academic peer group. Percentile rank (PR) and student growth percentile (SGP) are based on scale of 1-99. At least two tests are typically required to report a SGP. The method 700 proceeds to 708 to integrate all the scores into a unified score for placement of the target student by the learning-progression engine.

Figure 8:
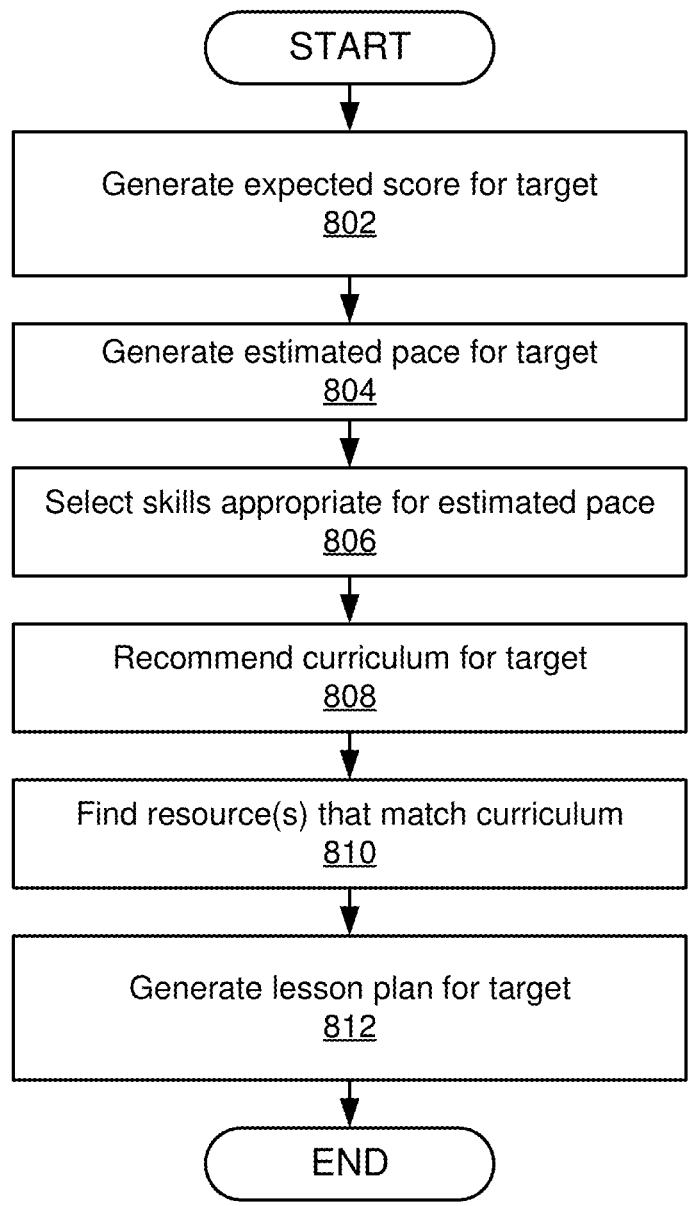
FIG. 8 is a flow chart illustrating an example method of a prescribed plan generated by the student-growth platform.

FIG. 8 describes an example method 800 for generating a lesson plan. The method 800 begins and proceeds to 802, including one or more operations for generating an expected score for a target (student). The example method 800 proceeds to 804, including one or more operations for generating an estimated pace for the target (student). The example method 800 proceeds to 806, including one or more operations for, selecting skills appropriate for the estimated pace for the target student. The example method 800 proceeds to 808, including one or more operations for recommending a curriculum for the target student. The example method 800 proceeds to the 810, includes one or more operations for finding resources that match the curriculum. The example method 800 includes one or more operations for generating a lesson plan for the target student.

Figure 9:
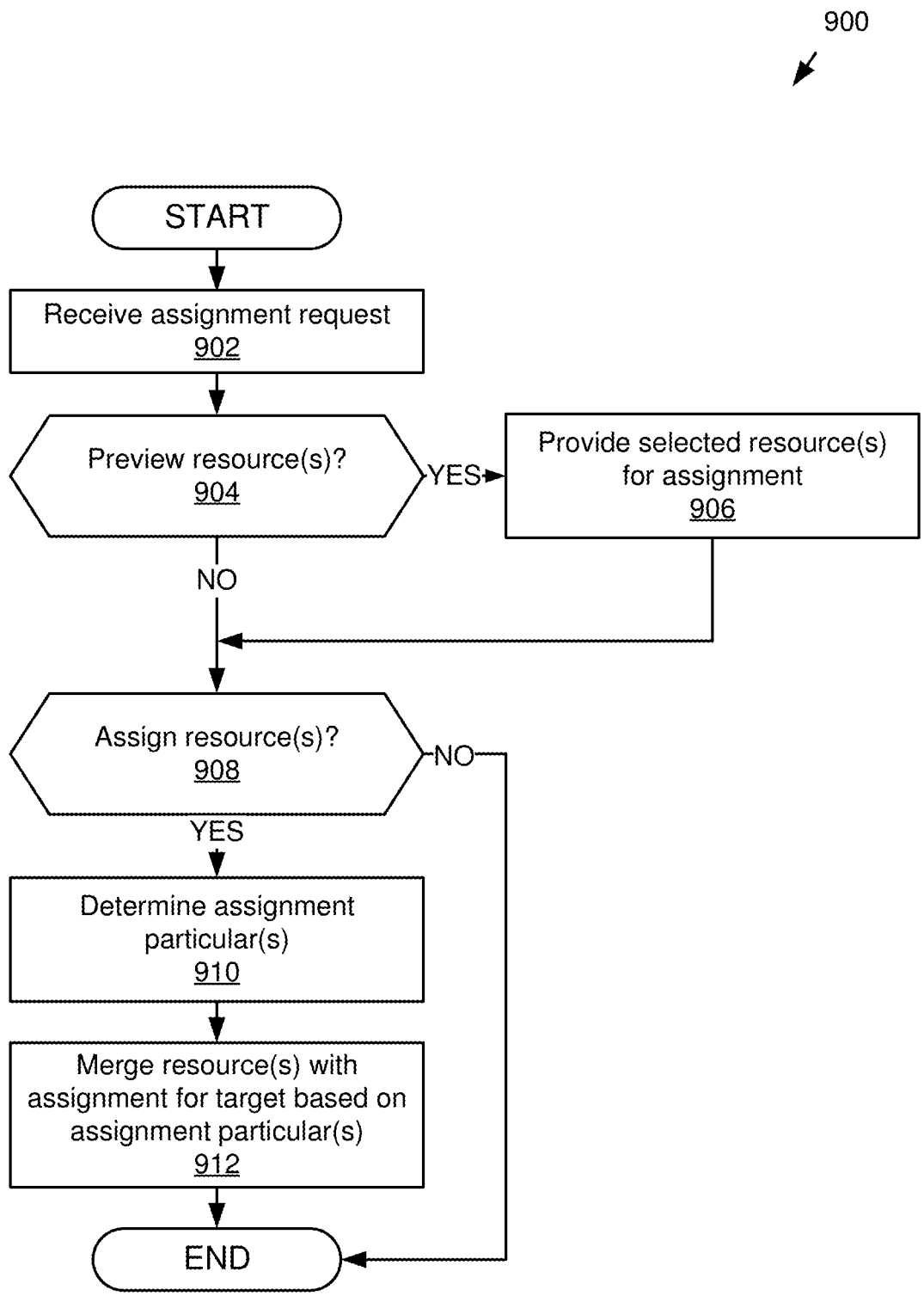
FIG. 9 is a flow chart illustrating an example method of prescribing assignments.

FIG. 9 describes an example method for creating and assigning assignments in accordance with the lesson plan. The example method 900 begins and proceeds to 902, at which point the example method receives an assignment request, generated with by the teacher or the student. The example process 900, at 904, includes a preview request for previewing the resource. If so, the method 900 provides 906 the selected resource for the assignment indicated in the preview request for presentation to the observer. In some embodiments, the electronic resource is provided by the student-growth platform 118 and/or media-distribution server 117 via the network 102 to a user/client device 106 of the observer (e.g., student or teacher). In other embodiments, other entities coupled to the network 102 may provide the electronic resource. By way of example, an observer who received a list of electronic resources from the recommendation engine 250 via the client application 108 can preview one or more of the electronic resources to learn more about the resource or resources, determine whether the subject matter of the resource is appropriate for the target subject, etc.

If the method 900 determines at 904 that the request does not include a preview request, the method 900 then determines at 908 whether the request includes an assignment request that require one or more electronic resources for a target subject for completion. If so, the method 900 determines 910 if any assignment particulars or parameters are associated with the assignment request. In some embodiments, an assignment particular places a condition on how the assignment of an electronic resource is to be completed. For example, the assignment particular may be a due date by which the target must interact with the electronic resource by. As a further example, if electronic resource is a video, the assignment particular may be a due date by which the target must watch the video by using an interface associated with the student-growth platform 118. If it is determined at 908 that the request does not include an assignment request for resources, the method 900 is then complete and ends.

Next, the method 900, at 912, merges the one or more electronic resources with the assignment for the target based on the one or more assignment particulars or parameters. In some embodiments, the method 900 may assign 912 the one or more electronics resources by storing a record of the assignment in the data store 410 (FIG. 4) in association with a user profile of the target. The record can include information describing the one or more electronic resources and the one or more assignment parameters. The method 900 is then complete and ends.

Figure 10:
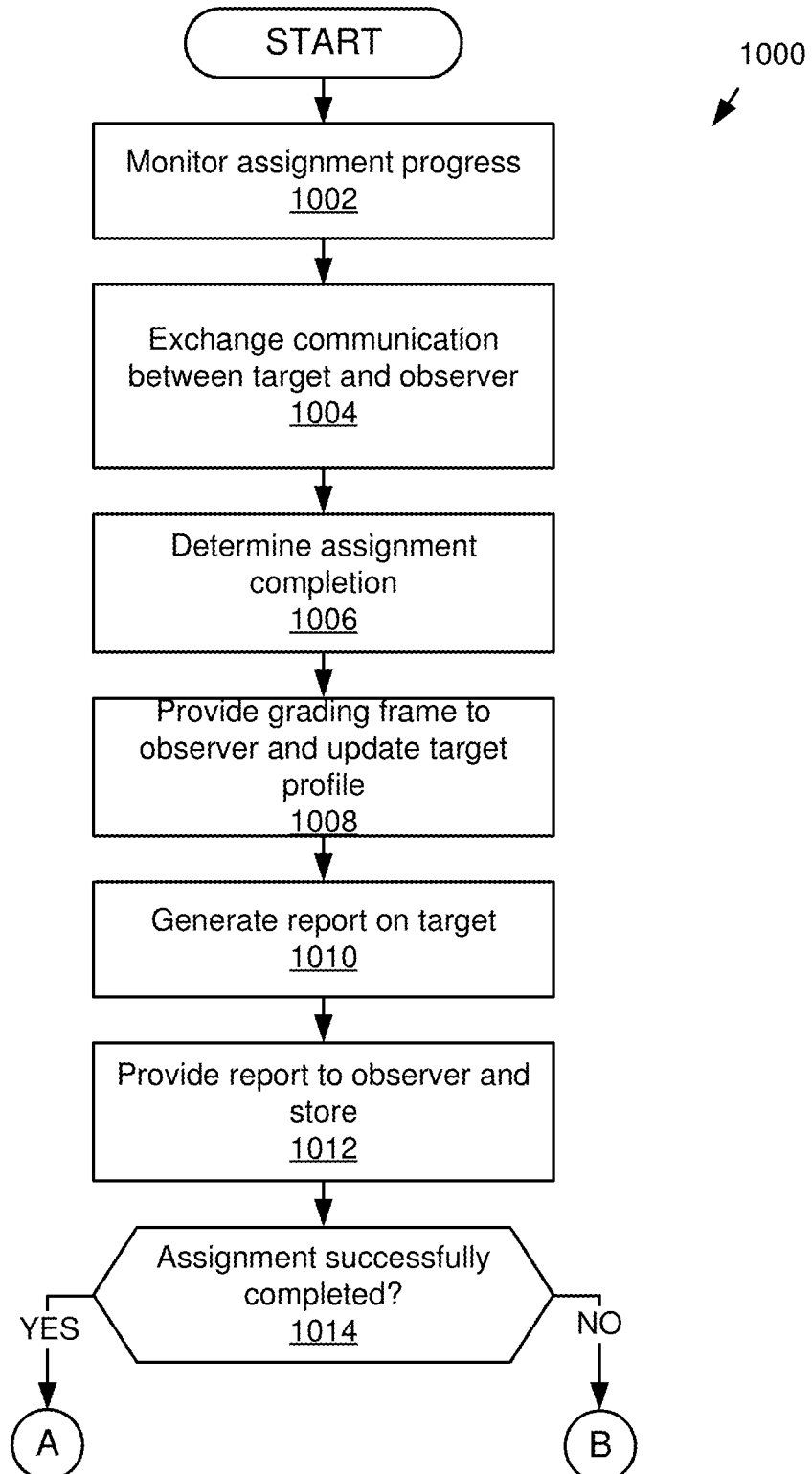
FIGS. 10 and 11 are a flow chart illustrating an example method of reporting by the student-growth platform.
Figure 11:
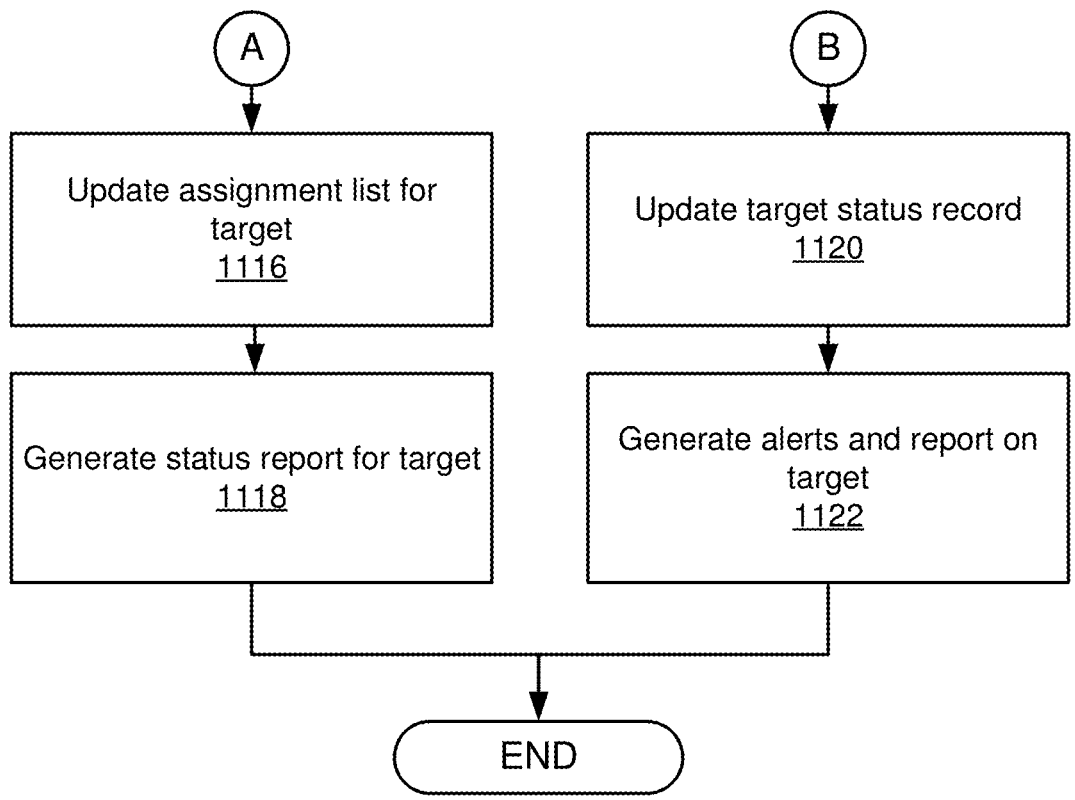

FIGS. 10 and 11 describe an example method 1000 for monitoring and reporting on assignments. The method 1000 begins by monitoring 1002 the progress of an assignment. The assignment may include the assignment of one or more electronic resources to a target for completion/interaction by the target subject. The assignment may also include one or more assignment parameters that dictate how the assignment should be completed by the target, and the method 1000 can analyze the assignment parameters to determine if the assignment has been completed. In some embodiments, the reporting platform 232 (FIG. 3) is configured to monitor the status of the assignment, including whether the assignment has been fully completed, is in progress, or has not begun.

The method 1000 continues by exchanging 1004 communications between the target and the observer of the target. In some embodiments, the method 1000 facilitates the exchange by providing the contact information (e.g., an electronic messaging address) of the target to the observer and vice versa. In other embodiments, the method 1000 exchanges communication by relaying electronic messages between messaging accounts of the target and the observer using an internal messaging service. Exchanging communication using other messaging services, such as email, instant messaging, SMS, etc., is also contemplated. In these embodiments, the method 1000 may store record of any communications exchanged between the target and the observer for later reference and retrieval. Exchanging communication between the observer and the target is advantageous in a number of respects including that it provides a feedback loop between the target and the observer. For example, the target may communicate questions to the observer about what specific areas the target should focus on improving when interacting with an electronic resource assigned to him/her by the observer, and the observer may provide feedback to the target. In some embodiments, the communications exchanged by the method 1000 may be included in a report generated by the reporting module 232 to summarize the interaction between a target and an observer.

Next, the method 1000 determines at 1006 the completion of the assignment. For example, the method 1000 can determine whether the assignment was successfully completed, was never begun, or was in progress at the conclusion of the time set for completing the assignment. The method 1000 then provides at 1008 the grading frame to the observer and updates the target profile to reflect the completion. In some embodiments, the reporting module 232 updates a record stored in the data store 410 with data reflecting the completion.

The method 1000 continues by generating 1010 a report describing the status of the assignment and providing it to the observer 1012 and/or other users. The report may include the completion determined by the method in block 1006, any electronic communication exchanged between the target subject in the observer in block 1004, and any other information about the assignment, including a description of the electronic resource(s), information from the observation file associated with the assignment, statistics and results from other observational assessments performed previously of the target subject, any related industry standards, performance benchmarks, requirements, etc.

The method 1000 then determines at 1014 whether the assignment was successfully completed. In some embodiments, this determination is based on the conclusion from block 1006. If the method 1000 determines at 1014 the assignment to have been successfully completed, the method 1000 continues by updating the assignment list for the target at 1016 and then at 1118 generating a status report for the target.

If the method 1000 determines at 1114 the assignment to have not been successfully completed, the method 1000 continues by updating the target status report and then proceeds to generate alerts and report on the target. The method 1000 is then complete and ends.

Figure 12:
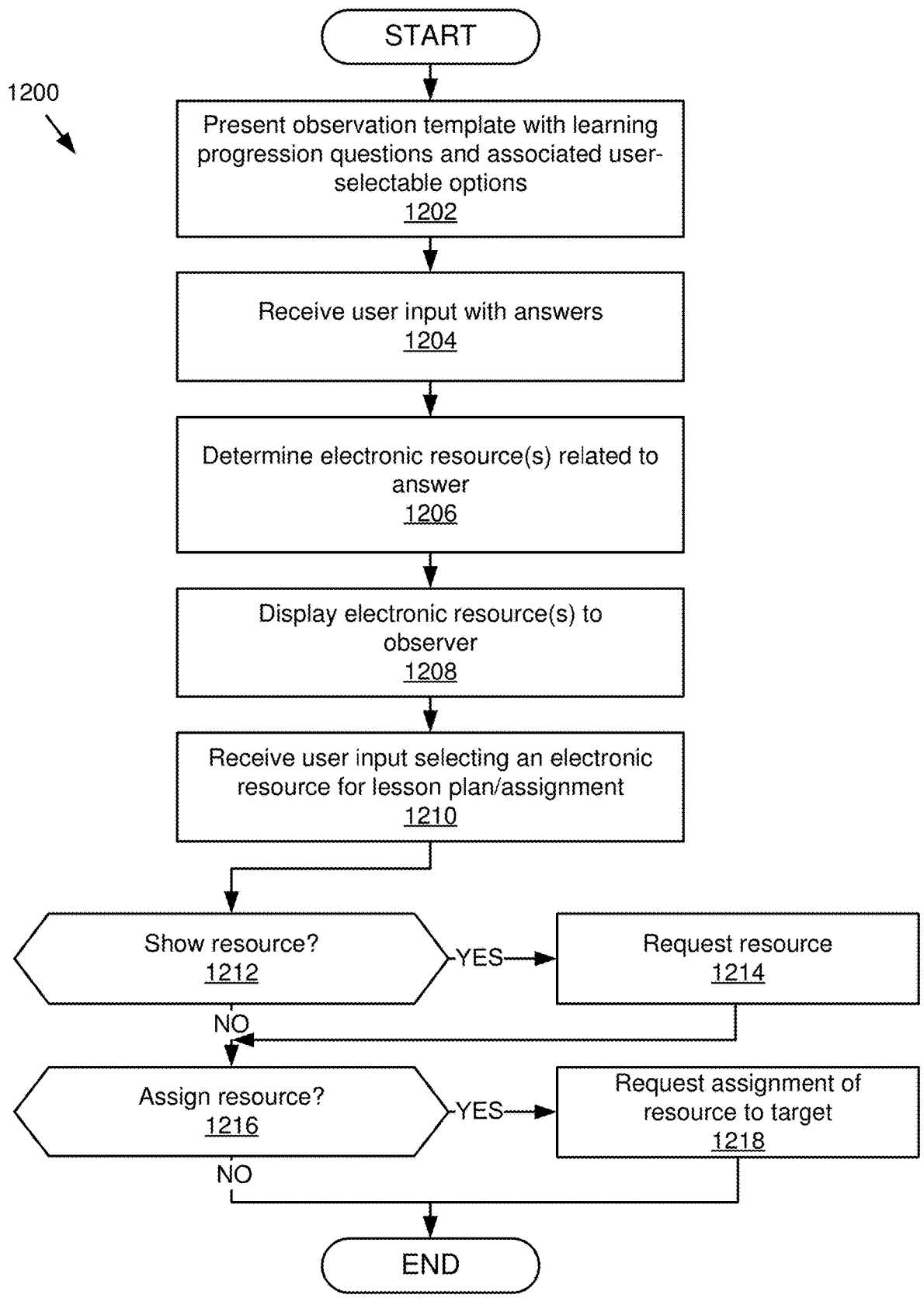
FIG. 12 is a flow chart illustrating an example method of determining electronic resources and associating them with the assignment.

FIG. 12 describes an example method 1200 for the learning-progression scenario. The method 1200 begins by presenting 1202 an observation template including learning progression questions and associated user-selectable/definable options to an observer of a target. In some embodiments, the user interface unit 119 (FIG. 1A) displays the observation template upon receiving interface signals from the observation engine 221. Next, the method 1200 receives at 1204 user input providing answers to a question and, based on the answers, the method 1200 determines at 1206 one or more electronic resources that relate to the answer. For example, the user interface unit 119 receives input signals providing observation data from the observer via the input device 512 and the assignment manager 260 generates an assignment request based on the observation data and transmits it to the assignment player 264. The assignment manager 260, in reply, identifies one or more electronic resources and sends them to the assignment player 264 and the assignment unit 264 instructs the display device 510 to display the one or more electronic resources to the observer.

The one or more electronic resources are then displayed 1208 by the method 1200 to the observer. Next, the method 1200 receives 1210 user input selecting one of the electronic resources, and determines 1212 whether the user input includes an instruction to present the resource for review for a lesson plan or assignment. If so, the method 1200 requests 1214 the electronic resource for presentation. In some embodiments, the method 800 sends a presentation request to the server hosting the resource requesting the server provide the electronic resource for presentation. For example, the electronic resource is a video and the assignment player 264 receives a video stream from the media-distribution server 115 responsive to sending a preview request to the resource-finder engine 252. If the user input does not include an instruction to present the resource, the method 1200 continues by determining 1216 whether the user input includes an instruction to assign the electronic resource to the target subject for completion. If so, the method 1200 requests 1218 the assignment of the electronic resource to the target. In some embodiments, an assignment request is sent by the assignment manager 260 to the assignment player 264 via the network 102 requesting the electronic resource be assigned to the target for completion. If the method 1200 determines 1216 that the user input does not include an instruction to assign the electronic resource, the method 1200 is then complete and ends.

Figure 13:
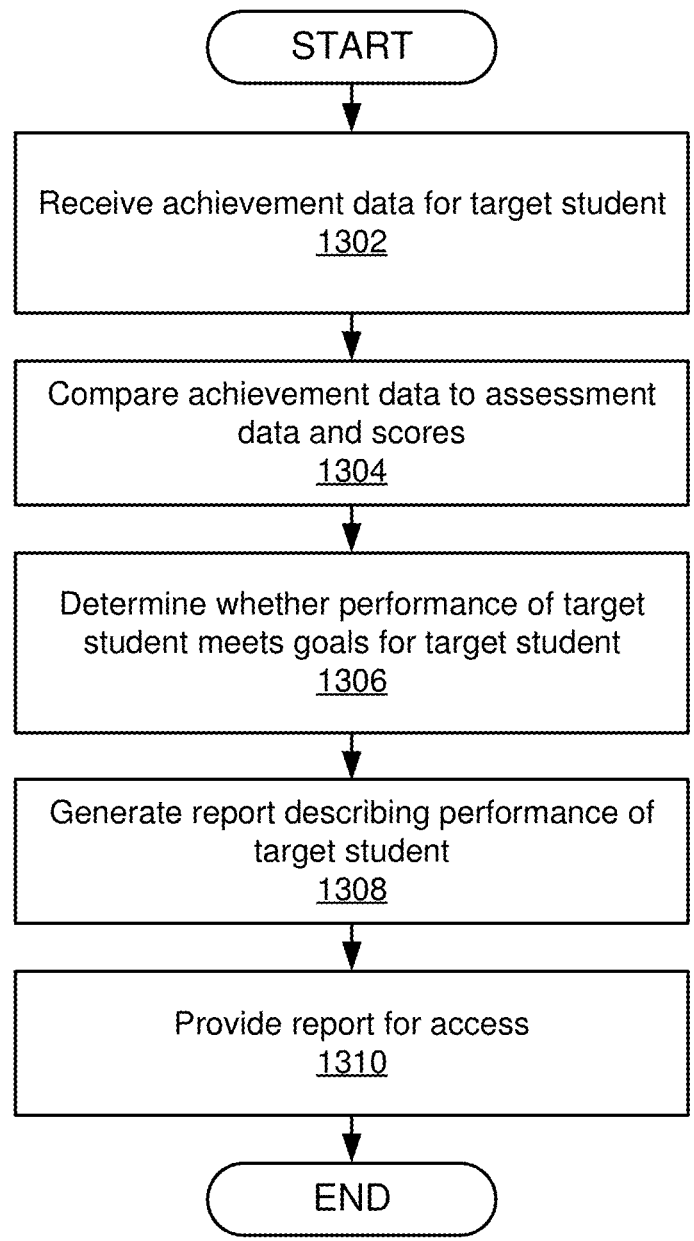
FIG. 13 is a flow chart illustrating an example method for reporting.

FIG. 13 describes an example method 1300 for assessing performance of a target. The method 1300 begins by receiving 1302 achievement data for at target student and comparing, at 1304, the achievement data to assessment data and scores associated with the target student. For example, the reporting platform 232 may access achievement data from the data store 113 (by exporting the data by the exporter engine 337) or from the third-party server 117 and compare it to observation data also accessed from the data store 113. In some embodiments, the observation data may be pulled from an associated observation file stored in the data store 113. Based on the comparison, the method 1300 determines at 1306 whether a performance assessment of a target student meets goals for the target student and generates at 1308 a report describing the performance of the target student describing the performance of the target student. For example, the reporting platform 232 can generate a report describing the determination it made about the target student's performance. The method 1300 provides at 1310 the report for access and display to an administrator, teacher, or other entity, and then completes and ends.

It should be understood that the methods 600-1300 are provided by way of example, and the variations and combinations of these methods, as well as other methods, are contemplated. For example, in some embodiments, at least a portion of the methods 600-1300 represent various segments of one or more larger methods and may be concatenated or various steps of these methods may be combined to produce other methods which are encompassed by the present disclosure. Additionally, it should be understood that the assignments of electronic resources and reporting on the conclusions of the assignments, as described with reference to at least the methods 600-1300, could be iterative, and thus repeated as many times as necessary to assist a target student with his or her growth and development.

To illustrate various aspects of the system 100a and the methods 600-1300, the following non-limiting example is provided. A school or district administrator or such third party may visit the classrooms of each teacher in his/her school to observe. The third party may launch the client application 108 on his/her wireless client device 106, and once launched, the observation unit 516 (FIG. 5) of the client application 108 may refresh a local repository with updated target information and observation templates received from the observation engine 221 via the network 102. The third party, using an interface generated by the user-interface module 514, may select previously completed observation files for a given student to view how the student performed during previous observation sessions.

Example User Interface

Figure 14:
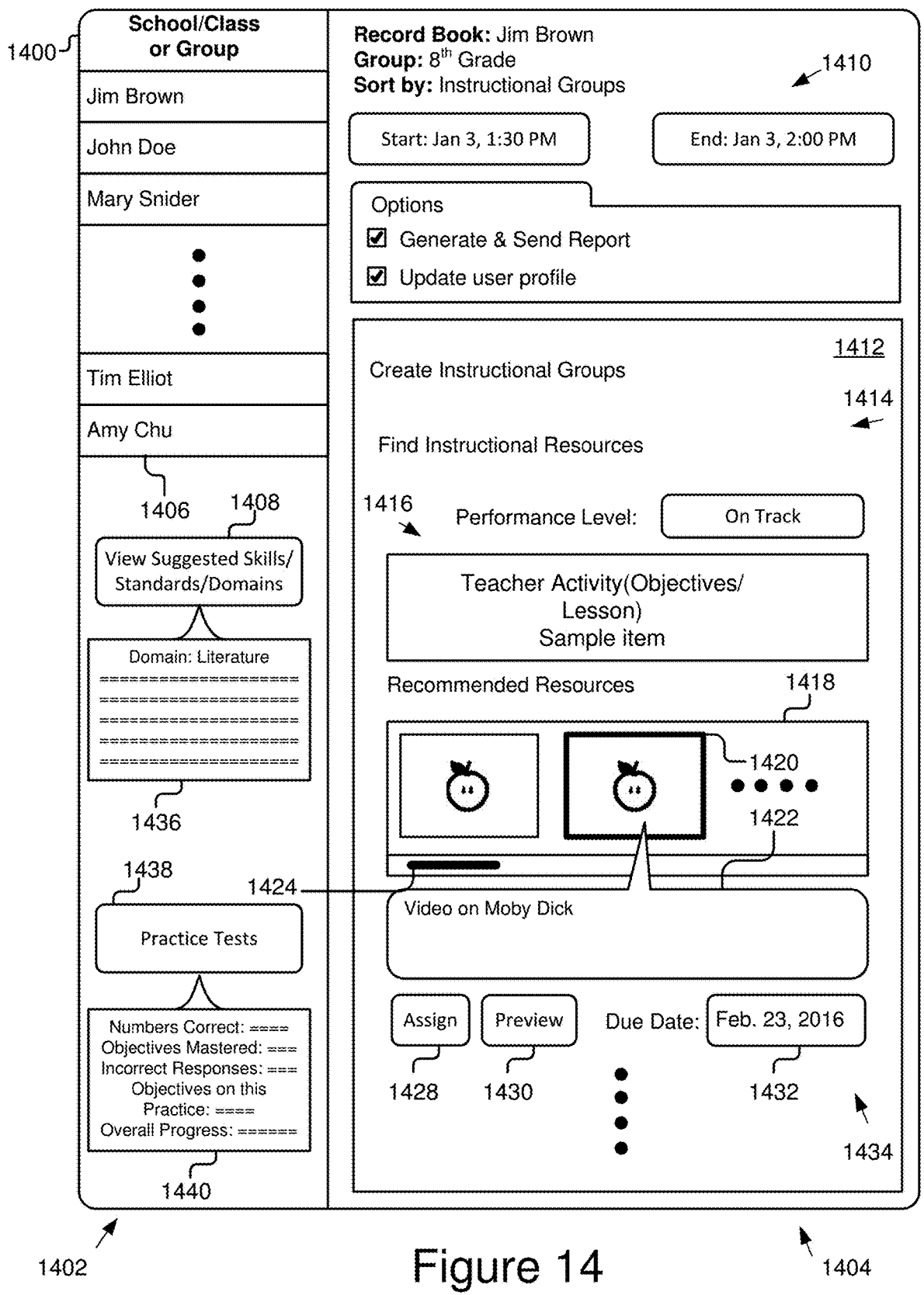
FIG. 14 is a observational graphic interface generated by the student-growth platform.

Referring now to FIG. 14, an example observation or user interface (or dashboard display) 1400 for the functionalities of the student-growth platform 118 is described. It should be understood that the example observation or user interface (or dashboard display) illustrated in FIG. 14 is provided merely by way of example, and that other user interface displays (with different criteria or user interactions) may be generated and displayed by the user/client application 108 to allow users 114 to interact with the system 100 (a and b) and to allow the system 100 to present information to the users. For example, various user interfaces may be produced, to display reports and statistics, display dialogs among the users (by a chat feature), set parameters and settings, send electronic communications, view, listen to and/or interact with the electronic resources provided by the student-growth platform, etc.

As depicted in FIG. 14, the observation interface 1400 includes a menu region 1402 and an observation region 1404. The menu region 1402 includes a listing of students belonging to a particular school, class, or group 1406. The menu region 1402 also includes a button 1408 for viewing suggested skills, which may be divided into domains (e.g., four domains including foundational skills, language, literature, informational text). The illustrated dashboard shows an example domain literature. Selecting a student selector 1406 displays a corresponding observation file created/being created for that particular student. For example, in the depicted embodiment, the student selector 1404 for Jim Brown has been selected and a corresponding observation file for Jim Brown is being populated with assessment information by the observer in the observation region 1004. Selecting the view suggested skills button 1408 creates a new observation file for a student from an observation template. In some embodiments, in response to the selection of the observation creation button, a dialog (not shown) displaying a list of users may be presented to the observer. In some embodiments, the list of users represents all of the students that are associated with a particular school, class, or group within a school. For example, in the educational setting, the list of users may include all of the students in a particular grade in a school, or may be a segmented list of students selected from all of the schools within a school district and their corresponding teachers and administrators. In some embodiments, this list is provided on demand to the observation unit 516 by the observation engine 221 via the network 102 and rendered for display by the user-interface module 514. In other embodiments, the observation unit 516 may retrieve the list from a local repository and provide it to the user-interface module 514 for display. Using the user interface, the observer may then select who the target student is from the list of users, and responsive to receiving this input, the user-interface module 514 may render the observation interface 1400 for the target student similar to the one displayed in FIG. 14.

Variation of this observational interface is possible. An observational interface may display a dashboard and screenshots that may be specific to a particular subject. In some embodiments, hovering over a standards bar once a skill is selected displays the standard code and text. Changing the selection to standards view displays the state-specific standards code; hovering over the code displays the standard's text.

The observation region may include a header region 1410 and a body region 1412. The header region 1010 includes fields for displaying who the target student of the observation is (e.g., Jim Brown) and which observation template is being used for the observation, and for inputting the date and time the observation session was started and completed. The header region 1410 also includes an options dialogue box for configuring settings, such as generating and sending a report and updating a user profile. For example, the observer may check a checkbox to set an option for generating and sending a report and for updating a user profile for storage in the data store 113 for later access.

The body region 1412 includes elements for the observer to input his/her assessments made during the observation. For example, as depicted, the body region 1412 includes a region 1414 indicating the following: create instructional groups, find instructional resources, and indicate a performance level. There is a window (which may appear as a pop-up) for teacher activity indicating teacher objectives and lesson, with indicating a sample item.

As depicted, the body region 1412 also includes a resource region 1434 for displaying one or more electronic resources. In some embodiments, the electronic resources displayed in the resources region 1434 are received from the recommendation engine 250 and displayed in the resource region 1434 responsive to the observer inputting information into the answer elements 1416. For example, upon receiving the input from the observer, the observation unit 516 transmits a resource request to the recommendation engine 250 requesting a list of related electronic resources be provided based on the input (e.g., observation data).

The resource region 1434, as depicted, includes a resource scrolling region 1418, a scrollbar 1424, one or more electronic resources 1420, a resource description region 1422, an assignment button 1428, a preview button 1430, and a due date button 1432. The resource scrolling region 1418 provides the user with functionality to scroll through and select one or more of the various electronic resources displayed therein. The scrolling can be performed by interacting with the scrollbar 1024 or the resource scrolling region 1018 (e.g., swiping the resource scrolling region 1018 via a touch-sensitive display with an input element, such as a finger). The selecting can be performed by interacting with the representations of the electronic resources in the resource scrolling region. For example, selecting on an electronic resource once selects the resource, and selecting it again unselects the resource. Multiple selection is also possible using known selection methods.

Once one or more resources have been selected by the observer, they can be previewed or assigned using the corresponding preview and assignment buttons 1430 and 1428. In some embodiments, selecting the preview button transmits a request for a selected electronic resource, and once received, displays the selected electronic resource(s) in a preview interface with interface elements allowing the user to view and interact with the electronic resource. For example, the selected electronic resource is a video and the selecting the preview button displays a media player for viewing the video.

In some embodiments, selecting the assignment button 1428 sends an assignment request to the assignment unit 518 requesting the assignment of the one or more selected electronic resources to the target student. In reply, the assignment unit 518 may send a confirmation response to the assignment unit 518 indicating that the one or more resources were successfully assigned. Once this response has been received, the scrollable resource region may be refreshed to only display the resources that were assigned and the assignment button 1428 may change to an unassign button to indicate that the displayed resources have been assigned and provide functionality for the observer to unassign them if desired. The due date button is an example of an input element for setting an assignment parameter. As depicted, when the due date button is selected, a calendar dialog is displayed for selecting a date for when the assignment of the one or more electronic resources should be completed. It should be understood that the observation interface 1400 could include any number of interface elements for setting assignment parameters.

In some embodiments, the resource region 1434 may initially be hidden from display until the user inputs observation data into one or more of the answer elements 1416. In other embodiments, the resource region 1434 may always be displayed, or may be hidden or displayed by selecting a corresponding expansion/contraction button (not shown). While only one assessment region 1414 and resource region 1434 are displayed in the depicted embodiment, it should be understood that numerous assessment regions 1414 and corresponding resource regions 1434 could be included. For example, there could be numerous standards and associated questions/indicators for measuring the target subject's performance during observation, and thus numerous corresponding resource regions for displaying electronic resources that correspond to the various assessments that have been made by the observer during the observation session.

An example system and methods for prescribing electronic resources based on observational assessments have been described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present disclosure can take the form of an entirely hardware embodiment, an entirely software embodiment or an embodiment containing both hardware and software elements. In a preferred embodiment, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   generating an observation interface for a target viewer, by a processor, the observation interface including a first region receiving input on observation data for a target student and a second region for displaying one or more projected tasks and electronic resources identified for the target student;
   providing the observation interface for display on an observer device;
   receiving an input via said observation interface, including assessment data reflecting an observational assessment of the target student based on several criteria including student-growth percentile data for the student;
   identifying a curriculum for the target student based on said assessment data by using said student-growth percentile algorithm to assess the target student, said assessment data reflecting a level of skills and a pace of learning for said target student;

positioning the target student by a learning-progression engine at an entry point for the curriculum;

creating a plurality of projected tasks by mapping a specific curriculum by using a universal skills pool;

populating the second region of the observation interface with said plurality of projected tasks and electronic resources based on the positioning the target student;

receiving resource data prescribing one or more recommended electronic instructional resources that provide learning according to a mapped curriculum;

updating the second region of the observation interface using second data to include a representation of each of the recommended electronic resources, the second region further including a user-selectable preview element to preview an electronic resource from the electronic resources, and a user-selectable assignment element for assigning at least one electronic resource of the one or more electronic resources displayed in the second region of the observation interface to the target student for completion;

receiving a selection by the observer of the user-selectable assignment element to assign at least one electronic resource of the recommended electronic resources included in the second region to the target subject for completion; and responsive to receiving the selection, designating an assignment of the least one electronic resource to the target student for completion within a predetermined time; and recording assignment data reflecting the assignment of the at least one electronic resource in a non-transitory data store in association with the target student.

2. The method of claim 1, further comprising:

identifying and matching the one or more electronic resources, by the processor and executable code, matching metadata associated with the one or more electronic resources to one or more aspects of the assessment data reflecting an area in which the target student should receive assignments and learning tasks and recording how the target student is performing in that area.

3. The method of claim 1, wherein the electronic resource includes a plurality of electronic resources and the method further comprises:

determining how much the target student improved relative to a predetermined standard by utilizing the electronic resource prescribed for the curriculum, and by comparing at least one aspect of performance for the target student with other students at the predetermined standard, by matching student profiles to determine if substantially similar to the target student, wherein the electronic resource includes a practice test for the projected task, results of the practice test used with the computer-adapted testing data to generate an integrated mastery model for the target student.

4. The method of claim 1, wherein assigning the electronic resource to the target student includes associating the electronic resource with a profile of the target student in the non-transitory data store, and the assignment is an instruction for the target student to interact with the at least one electronic resource.

5. The method of claim 1, comprising:

receiving an assignment parameter associated with an assignment request that indicates a condition that must be met in order for the assignment to be completed by the target student, wherein assigning the electronic resource to the target student is based at least in part on the assignment parameter.

6. The method of claim 1, wherein the electronic resource includes one or more of textual data, image data, video data, and audio data, and wherein the video data includes a digital video transmittable via a network.

7. The method of claim 1, further comprising:

determining a mastery designation for the target student by defining a first criterion to measure mastery of a first skill, defining a second criterion to measure mastery of a sub-skill of the first skill, and determining an improvement measure from the second criterion when the first criterion is not met.

8. The method of claim 1, comprising:

monitoring whether the assignment has been completed;

generating, by the processor, a report describing whether the assignment has been completed by the target student; and providing the report for display via the observer interface, wherein monitoring of assignment completion by the target student includes analyzing interaction data and an assignment parameter associated with the assignment to determine whether the assignment parameter has been satisfied, and the report is generated based on the determination regarding the assignment parameter.

9. The method of claim 1, comprising:

receiving achievement data for the target student; and updating, by the processor, the observational interface with the achievement data of the target student for viewing by the observer and others.

10. A computer program product comprising a non-transitory computer-usable medium including instructions which, when executed by a computer, cause the computer to:

generate an observation interface including a first region configured to receive observation data for a target student and a second region configured to display one or more projected tasks and electronic resources identified for the target student;

provide the observation interface for display on a display device of an observer;

receive an input via a displayed observation interface, the input including assessment data reflecting an observational assessment of the target student based on several criteria including 1) time elapsed since a last assessment for the target student based on a standard by a governing entity, 2) computer-adapted testing data for the target student, and 3) student-growth percentile data for the target student;

use a student-growth percentile algorithm to assess the target student with the assessment data based on the time elapsed since the last assessment for the target student, to determine a level of skills and sub-skills of competency for the target student and a pace at which the target student should learn the skills and sub-skills, and position the target student based on the level and a pace;

populate the second region of the observation interface with the one or more projected tasks and electronic resources identified for the target student based on the positioning of the target student by a learning-progression engine at an entry point for a curriculum identified for the target student based on the assessment data, the projected tasks created by mapping the identified curriculum including an observer's own instruction using a universal skills pool;

receive resource data prescribing the one or more identified electronic resources that provide learning according to a mapped curriculum;

update the second region of the observation interface using the resource data to include a representation of each of the identified electronic resources, the second region further including a user-selectable preview element to preview an electronic resource from the electronic resources, and a user-selectable assignment element configured to assign at least one electronic resource of the identified electronic resources displayed in the second region of the observation interface to the target student for completion;

receive a selection by the observer of the user-selectable assignment element to assign at least one electronic resource of the identified electronic resources included in the resource region to the target student for completion;

responsive to receiving the selection, designate an assignment of the at least one electronic resource to the target student for completion within a predetermined time; and record assignment data reflecting the assignment of the at least one electronic resource in a non-transitory data store in association with the target student.

11. The computer program product of claim 10, wherein the instructions further cause the computer to identify an electronic resource, by matching metadata associated with the electronic resource to one or more aspects of the assessment data reflecting a specific area for directing assignments and learning tasks to the target student and recording how the target student is performing in said specific area.

12. The computer program product of claim 10, wherein said electronic resource has associated instructions that further cause the computer to:

determine improvement of the target student relative to a predetermined standard by utilizing said electronic resource prescribed for the curriculum, and by comparing at least one aspect of performance for the target student with other students at the predetermined standard, by matching student profiles to determine if substantially similar to the target student, wherein the electronic resource includes a practice test for the projected task, results of the practice test used with the computer-adapted testing data to generate an integrated mastery model for the target student.

13. The computer program product of claim 10, wherein assigning the said electronic resource to the target student includes associating said electronic resource with a profile of the target student in the non-transitory data store, and the assignment is an instruction for the target student to interact with the at least one electronic resource.

14. The computer program product of claim 10, wherein the instructions further cause the computer to:

receive an assignment parameter associated with an assignment request that sets a condition that must be met in order for the assignment to be completed by the target student, wherein to assign said electronic resource to the target student is based at least in part on the assignment parameter.

15. The computer program product of claim 10, wherein said electronic resource includes one or more of textual data, image data, video data, and audio data, and wherein the video data includes a digital video transmittable via a network.

16. The computer program product of claim 10, wherein the instructions further cause the computer to:

determine a mastery designation for the target student by defining a first criterion to measure mastery of a first skill, defining a second criterion to measure mastery of a sub-skill of the first skill, and determining an improvement measure from the second criterion when the first criterion is not met.

17. The computer program product of claim 10, wherein the instructions further cause the computer to:

monitor whether the assignment has been completed;

generate a report describing whether the assignment has been completed by the target student; and provide the report for display to the observer, wherein the monitoring whether the assignment has been completed by the target student includes analyzing interaction data and an assignment parameter associated with the assignment to determine whether the assignment parameter has been satisfied, and the report is generated based on the determination regarding the assignment parameter.

18. The computer program product of claim 10, wherein the instructions further cause the computer to:

receive achievement element data for the target student; and updating the observational interface with the achievement data of the target student for viewing by the observer and others.

19. A system comprising:

a processor;

an observational-interface executable by the processor to generate an observational-interface including a first region configured for observation data for a target student and a second region for display of a projected task and an electronic resource identified for the target student, the observational-interface for display on an observer display device;

an assessment engine, executable by the processor, to receive an input via the observational-interface, the input including assessment data reflecting an observational assessment of the target student based on several criteria including 1) time elapsed since a last assessment for the target student, 2) computer-adapted testing data of the target student, and 3) student-growth percentile data of the target student;

a mastery engine configured determine a mastery designation for the target student by defining a first criterion to measure mastery of a first skill, defining a second criterion to measure mastery of a sub-skill of the first skill, and determining an improvement measure from the second criterion when the first criterion is not met;

a recommendation engine, executable by the processor, to automatically position the target student by a learning-progression engine at an entry point for a curriculum identified for the target student based on the assessment data, the projected task created by mapping the identified curriculum using a universal skills pool, the recommendation engine, further executable by the processor, to receive resource data prescribing the one or more identified electronic resources that provide learning according to a mapped curriculum;

an assignment engine, executable by the processor, to update the second region of the observation interface using the resource data to include a representation of the electronic resource, the second region further including a user-selectable preview element to preview and select the electronic resource, and a user-selectable assignment element configured to assign the electronic resource to the target student for completion, the assignment engine, further executable by the processor, to receive a selection by the observer of the user-selectable assignment element to assign the electronic resource in the second region to the target student for completion; and the assignment engine, further executable by the processor, responsive to receiving the selection, to designate an assignment of the electronic resource to the target student for completion within a predetermined time.

20. The system of claim 19, wherein the assignment engine is configured to associate the electronic resource with a profile of the target student in a non-transitory data store, the assignment being an instruction for the target student to interact with the electronic resource; the assignment engine further configured to receive an assignment parameter associated with an assignment request and to assign at least one electronic resource to the target student based at least in part on the assignment parameter, the assignment parameter defining a condition for completion of the assignment.

\* \* \* \* \*